(12) United States Patent
Gailey et al.

(10) Patent No.: US 8,700,788 B2
(45) Date of Patent: *Apr. 15, 2014

(54) METHOD AND SYSTEM FOR AUTOMATIC LOGIN INITIATED UPON A SINGLE ACTION WITH ENCRYPTION

(75) Inventors: Kurt Gailey, Benbrook, TX (US); Kirkland M. Godby, Fort Worth, TX (US)

(73) Assignee: SmartIcon Technologies, LLC, Fort Worth, TX (US)

( * ) Notice: Subject to any disclaimer, the term of this patent is extended or adjusted under 35 U.S.C. 154(b) by 73 days.

This patent is subject to a terminal disclaimer.

(21) Appl. No.: 12/770,864

(22) Filed: Apr. 30, 2010

(65) Prior Publication Data

US 2010/0211796 A1 Aug. 19, 2010

Related U.S. Application Data

(63) Continuation-in-part of application No. 11/834,408, filed on Aug. 6, 2007.

(60) Provisional application No. 60/838,825, filed on Aug. 18, 2006.

(51) Int. Cl.
*G06F 15/16* (2006.01)

(52) U.S. Cl.
USPC .............. 709/229; 709/217; 709/218; 705/5; 705/44

(58) Field of Classification Search
USPC ........................................ 709/229
See application file for complete search history.

(56) References Cited

U.S. PATENT DOCUMENTS

| | | | |
|---|---|---|---|
| 5,689,638 A | 11/1997 | Sadovsky | |
| 5,935,251 A | 8/1999 | Moore | |
| 6,269,395 B1 | 7/2001 | Blatherwick | |
| 6,278,448 B1 | 8/2001 | Brown | |
| 6,378,075 B1 | 4/2002 | Goldstein | |
| 6,460,038 B1 | 10/2002 | Khan | |
| 7,016,875 B1 * | 3/2006 | Steele et al. | 705/44 |
| 7,136,631 B1 | 11/2006 | Jiang et al. | |

(Continued)

OTHER PUBLICATIONS

Claire Cain Miller, "On the Go and Hungry? Dinner is an App Away, The New York Times," May 30, 2010, pp. 1-3, New York, NY, US.

(Continued)

*Primary Examiner* — Hua Fan
(74) *Attorney, Agent, or Firm* — Whitaker Chalk Swindle & Schwartz PLLC; Stephen S. Mosher

(57) ABSTRACT

A method and system for secure automatic user login to a destination website in a single action, without the use of a file manager, cookies, or without storing user login information in a data folder having restricted access or that is external to the user PC. A user computer having a display, a mouse, and a browser is activated for establishing an Internet connection. The connection may be established from the user computer to the destination website with a single mouse click or a single touch on a displayed vendor icon or other symbol placed on a displayed graphic of the user PC display such as the desktop, task bar, or tool bar during a prior setup process. During the setup, an encrypted token is produced encrypting the user credential information. The encrypted token may be stored in the user data folder.

7 Claims, 17 Drawing Sheets

(56) References Cited

U.S. PATENT DOCUMENTS

| | | |
|---|---|---|
| 7,222,087 B1 | 5/2007 | Bezos et al. |
| 2001/0003179 A1 | 6/2001 | Martyn et al. |
| 2002/0007460 A1* | 1/2002 | Azuma ................ 713/201 |
| 2002/0133706 A1 | 9/2002 | Khanna et al. |
| 2002/0138728 A1 | 9/2002 | Parfenov et al. |
| 2002/0186249 A1 | 12/2002 | Lu et al. |
| 2003/0016241 A1 | 1/2003 | Burke |
| 2003/0163740 A1 | 8/2003 | Thjai et al. |
| 2003/0217288 A1 | 11/2003 | Guo et al. |
| 2004/0139355 A1 | 7/2004 | Axel et al. |
| 2004/0158746 A1 | 8/2004 | Hu et al. |
| 2005/0033968 A1 | 2/2005 | Dupouy et al. |
| 2005/0198220 A1 | 9/2005 | Wada et al. |
| 2006/0005207 A1 | 1/2006 | Louch et al. |
| 2006/0059359 A1 | 3/2006 | Reasor et al. |
| 2006/0112420 A1 | 5/2006 | Challener et al. |
| 2006/0206709 A1 | 9/2006 | Labrou et al. |
| 2006/0271689 A1 | 11/2006 | Kikuchi |
| 2007/0283275 A1 | 12/2007 | Azam |
| 2008/0016232 A1 | 1/2008 | Yared et al. |
| 2008/0133708 A1* | 6/2008 | Alvarado et al. ............. 709/218 |
| 2009/0271854 A1* | 10/2009 | Hazlehurst et al. ............... 726/7 |
| 2009/0328169 A1 | 12/2009 | Hutchison et al. |

OTHER PUBLICATIONS

David Wethe, "With a Few Clicks, Your Lunch is Served," Star-Telegram (newspaper), Jan. 20, 2008, pp. 1E and 5E, 2 sheets, Fort Worth, Texas, US.

* cited by examiner

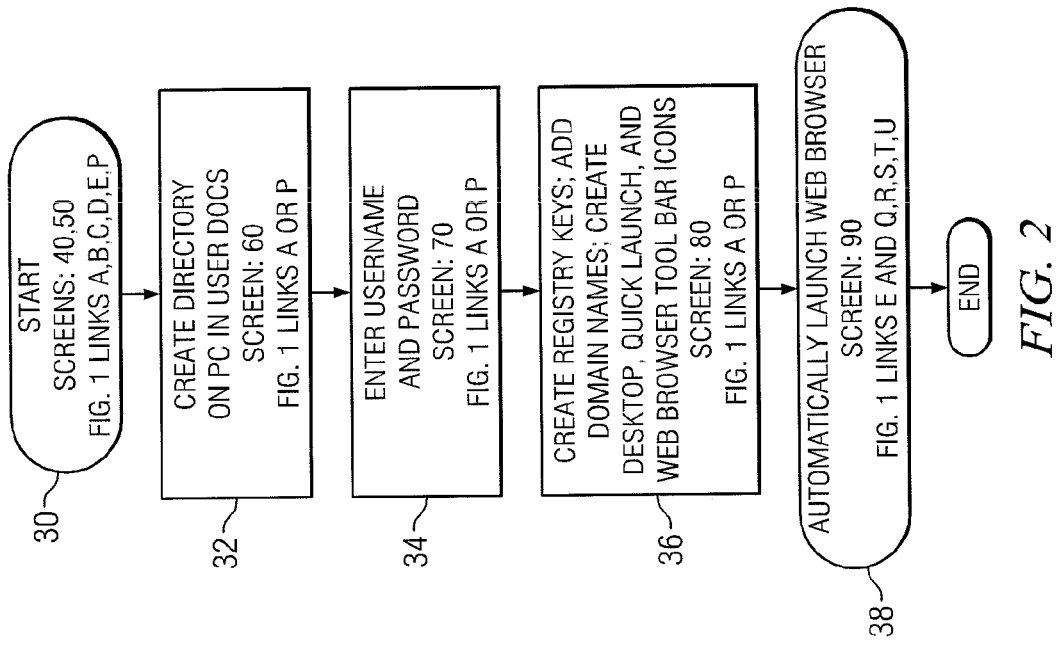
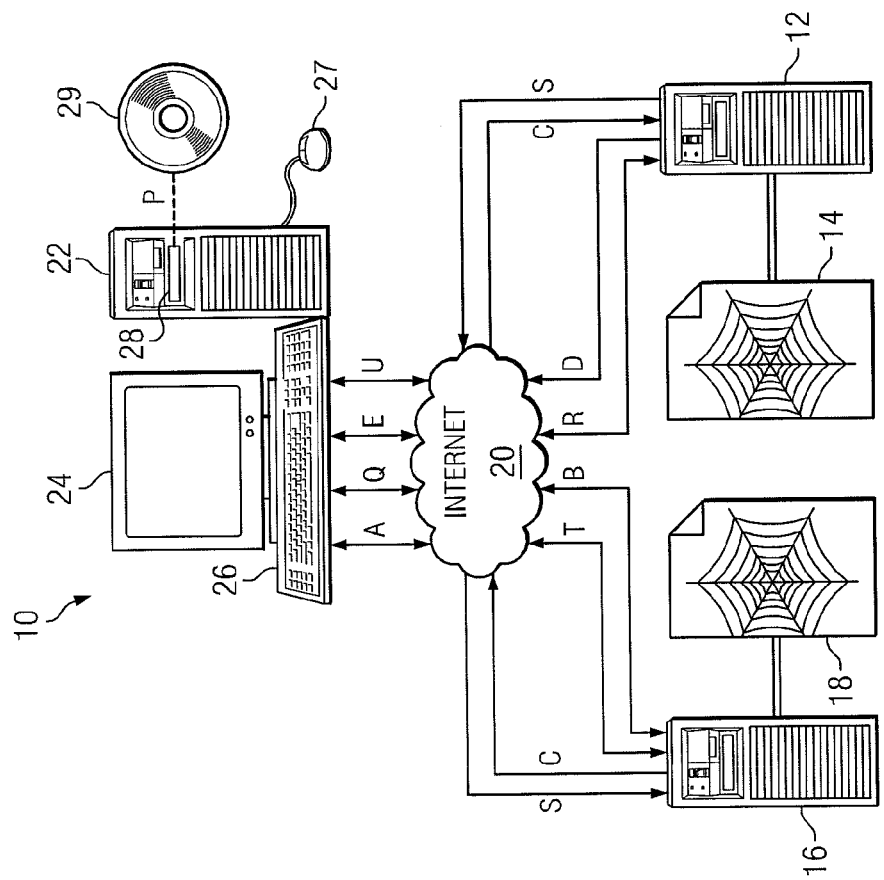

METHOD AND SYSTEM FOR AUTOMATIC LOGIN INITIATED UPON A SINGLE ACTION WITH ENCRYPTION

CROSS REFERENCE TO RELATED APPLICATION

The present U.S. patent application is a Continuation-In-Part application of U.S. patent application Ser. No. 11/834,408 filed Aug. 6, 2007 and entitled "METHOD AND SYSTEM FOR AUTOMATIC LOGIN INITIATED UPON A SINGLE ACTION," which claims priority from earlier filed U.S. Provisional Patent Application Ser. No. 60/838,825, filed Aug. 18, 2006 and entitled "ONE-CLICK AUTOMATIC LOGIN."

BACKGROUND OF THE INVENTION

1. Field of the Invention

The present invention generally relates to computer applications and more particularly to connecting a user to a remote site on a network.

2. Background of the Invention and Description of the Prior Art

The prior art includes a number of methods and systems for reducing the number of user actions or keystrokes for accessing or logging in to a website. For example, some prior art methods require at least two clicks of a mouse to enable a user to launch a browser (first click) to connect to the Internet, followed by launching an application to login to a website using, for example, a password manager (second click). This process just described provides a login that eliminates the need to enter the username and password each time that website is accessed. However, this process has several disadvantages. First, the user must gain access to the Internet, then enter a command to the password manager, requiring at least two clicks and some amount of time delay to complete the launch, connection and login. Moreover, the website being accessed requires further user actions to reach the page(s) of interest, and typically additional time to enter information requested.

The so-called password manager applications have a number of characteristics that impair the efficiency of a login process. For example, as noted above, the password manager application must be running in the background of an operating PC system in order for a login action from them is operative, that is, the application must be open and running before a connection to the Internet may be launched. Second, a password manager is basically a secure storage system for all of the sensitive user ID and password information a typical computer user must use to gain access to desired websites and accounts, many of which are used repetitively. The storage space for this "vault" is typically on the user PC's hard drive (just as a cookie is stored, for example) or in a database which must be accessed for login to take place. Third, the installation of a password manager having the foregoing characteristics must usually be accomplished by a system administrator to ensure compatibility with the system security protections, SPAM filters and the like. Fourth, the typical password manager application requires the use of substantial amounts of code because of the complexity of the operations performed, including the encryption and decryption that must take place during its use. For these and other reasons, it is difficult and impractical for a password manager to be configured for true, single action or single click login from the user PC to a desired web page on a website that is used repetitively by a user, without making basic and disabling modifications to the password manager application.

More generally, in most known methods and systems, login data is stored in a cookie on the user's computer system or is stored in a database external to the user's system such that the data must be accessed during the login process. These methods use time and resources of the user in a way that becomes inefficient when the login process must be performed frequently during a business day, thus having a negative impact on business productivity. For example, in businesses where courier services are used many times during a business day, being able to enter repetitive orders for the delivery of articles to clients in minimum time and effort can provide substantial cost savings in terms of the accumulated computer and human labor time expenditures for processing orders. Further, installing or setting up most systems also typically and often unnecessarily requires the services or authorization of a system administrator to ensure that these inefficient login processes do not disrupt other business communications being carried out in the user's computer system or network.

One example of a system that uses cookies is U.S. Pat. No. 5,960,411 issued to Hartman et al., which enables a user to send a request to order an item to a server by a single mouse click on an order button, but after the user has logged onto the website of interest and after navigating the website to locate the item and the corresponding order button. Login information is stored in a cookie. In another example of the use of a cookie, U.S. Pat. No. 6,819,340 issued to Burke, a shortcut link provided by software downloading from a vendor website, includes a graphic image such as a logo, trademark, or icon stored in a cookie. The graphic image may appear in a menu on the user's desktop, and enables the user to access a web page of the vendor by selecting the graphic image.

One example of a system that requires an external database is U.S. Pat. No. 6,378,075 issued to Goldstein et al., which enables single action (e.g., upon a single click of a mouse button) business transactions by a user with any website in conjunction with a "trusted agent server." The trusted agent server is an external database (that stores user account information) and program addressed by a URL. It is a system typically used by service providers such as banks, credit card companies, etc. In another example of the use of an external database, U.S. Pat. No. 7,093,019 issued to Bertani et al., automated login to a provider is provided without the use of cookies but requires two servers, one having a registration database, the other associated with the destination website. During access by a single click on a mark, the user information, established during a prior initial login, is authenticated during each login event by the registration server when the user enters the URL of the destination server.

The foregoing examples are representative of numerous conventional methods and systems. The prior art thus requires substantial user and/or provider resources, interaction and attention, which is especially cumbersome and wasteful when the same website must be accessed frequently and much of the same information must be repetitively entered. In some businesses, such operations may require up to a minute of time to complete a very simple order entry transaction, for example. What is needed is a simpler, faster method and system for repetitively logging in to a page of a provider that takes far less time to complete such routine tasks. It would be preferred if the system does not require the use of a password manager, cookies or external databases, does not require the intervention of a system administrator, is easily installed, and sharply reduces the time and labor of the login process, thereby providing a substantial gain in business productivity.

In some client applications, however, it is necessary to provide for encrypting the login information, particularly if it contains or is intended to contain confidential data or other personal information. Thus a need also exists for a method and system for login with a single action that not only avoids the use of cookies, file managers, external databases, or the services or permission of an administrator, but also provides for encrypting the login information.

SUMMARY OF THE INVENTION

Accordingly a method and apparatus are disclosed for automatic user login from the desktop of a user PC to a destination website, or to a specific page of the destination website, by executing a single user action such as a mouse click or a single touch upon a displayed icon or symbol of a service provider, for example. In one embodiment the method comprises the steps of: activating a user computer having a display, a mouse, and a browser for establishing an Internet connection; and establishing the Internet connection from the user computer to the destination website with the single action on the icon, which was placed on a displayed graphic of the user computer during a prior setup process. The method and system do not require a password manager, do not use cookies or external databases, nor do they require any configuration or process involving a system administrator during the setup of the method and system.

In a broad aspect, the invention provides a method and system for connecting a user to a web page at a website via a network by a single initiating action upon a visible or audible symbol displayed or emitted by a user computing or telecommunication device.

In one aspect there is provided a method of installing a single action connection from a desktop of a user PC to a predetermined page on a website, comprising the steps of: placing a predetermined icon of the service provider on a displayed graphic of the user PC having a browser application, during a setup process comprising the steps of: running an executable application on the user PC downloaded from file on a principal web server via an affiliate web server to create a designated directory in a user document file of the user PC; writing the predetermined icon from the affiliate web server to a folder in the user document file of the user PC; and writing login data for the user to the system configuration registry of the user PC.

In another aspect, there is provided a method for automatic login from the desktop of the user PC to a destination website on the Internet responsive to a single user action, comprising the steps of: performing a setup process comprising the steps of: activating a user PC having a display, a mouse (or its functional equivalent, such as a touch pad) and a browser application for establishing an Internet connection; downloading a file from a principal server on the Internet containing an executable application for single action login to a destination website associated with an affiliate server on the Internet; running the executable application on the user PC to create a designated directory in a user document file of the user PC; writing a predetermined icon associated with the destination website from the affiliate web server to a folder in the user document file of the user PC; writing login data for the affiliate web server to the system configuration registry of the user PC; and displaying the predetermined icon on the display of the user PC; and thereafter: performing a login process from the user PC to the destination website, without the use of a cookie or a database external to the user PC, comprising the steps of: selecting the predetermined icon that is displayed on the user PC in a single action to launch the browser to the principal server; loading the identification page at the principal server to collect the username, password and the URL of the desired affiliate server; executing the login to the affiliate server; and displaying on the user PC the web page of the destination website from the affiliate server.

In another aspect, there is provided a system for accessing an Internet website to complete entry of an order, comprising: a principal server coupled to the Internet for supplying an executable application and links for interconnecting at least one service provider and a plurality of customers; an affiliate server coupled to the Internet and associated with the service provider; a user PC associated with each customer and coupled to the Internet, wherein each user PC includes a browser application; and an executable application installed in the user PC during a set up process that provides the user PC with single action login from the desktop to a predetermined page on a website associated with the affiliate server without the use of cookies or a database external to the user PC for storing login data.

In another aspect, there is provided a system for login to an Internet website from a desktop in a single action, comprising: a principal server coupled to the Internet for supplying an executable application and links for interconnecting at least one service provider and a plurality of customers; an affiliate server coupled to the Internet and associated with the service provider; a user PC associated with each customer and coupled to the Internet, wherein each user PC includes a browser application; and an executable application installed in the user PC during a set up process that provides the user PC with single action login to a predetermined page on a website associated with the affiliate server without the use of cookies or a database external to the user PC for storing login data; wherein the executable application comprises: a first instruction sequence for storing a predetermined icon of the service provider in a user document file of the user PC; a second instruction sequence for storing login data in the system configuration registry of the user PC along with URL data for an affiliate server associated with the service provider; a third instruction sequence for displaying the predetermined icon on a display segment of the user PC; an assembler for building a URL string containing the login data for accessing the affiliate server upon selecting the displayed predetermined icon in a single action; and a selection device on the user PC for launching the browser application from the user PC and completing the login to the affiliate server responsive to the single action selection.

In an embodiment that includes encryption, a method is disclosed for secure automatic login to a destination website on the Internet comprising the steps of configuring a user PC, the user PC including a browser, for storing a predetermined icon graphic, user credential information, and a URL for the destination website in a user data folder in the user PC; producing an encrypted token encrypting the user credential information and storing the encrypted token in the user data folder; storing the predetermined icon graphic in the user data folder; associating launching the browser with executing a single action on the user PC; and thereafter executing the single action on the predetermined icon at the user PC to establish a secure connection to the destination website using the encrypted token. In another aspect, the login is accomplished without the use of cookies or a file manager program, or without storing user login information in a data folder having restricted access or that is external to the user PC.

In another embodiment that includes encryption, a method is disclosed for installing a single action connection from a user PC to a destination website, comprising the steps of: placing a predetermined icon on a displayed graphic of the installing user PC having a browser application, during a setup process comprising the steps of running an executable application on the user PC downloaded from a file on a principal web server via an affiliate web server to configure the user PC for the single action connection; entering login credential data for the user and a URL for the destination website into a system configuration registry of the user PC; encrypting the login credential data to produce an encrypted token; designating a file in a user data folder of the user PC; and writing the encrypted token and the predetermined icon for the destination website from the affiliate web server to a file in the user data folder. In another aspect of this method, the step of encrypting comprises the steps of: forming the encrypted token having data representing user login credentials, application identification, and installer version encrypted therein; and returning the encrypted token to the installing user PC.

BRIEF DESCRIPTION OF THE DRAWINGS

FIG. 1 illustrates a system block diagram for a setup method according to the present invention;

FIG. 2 illustrates a flow chart of the setup process performed by the embodiment of FIG. 1;

DETAILED DESCRIPTION OF THE INVENTION

Figure 3A:
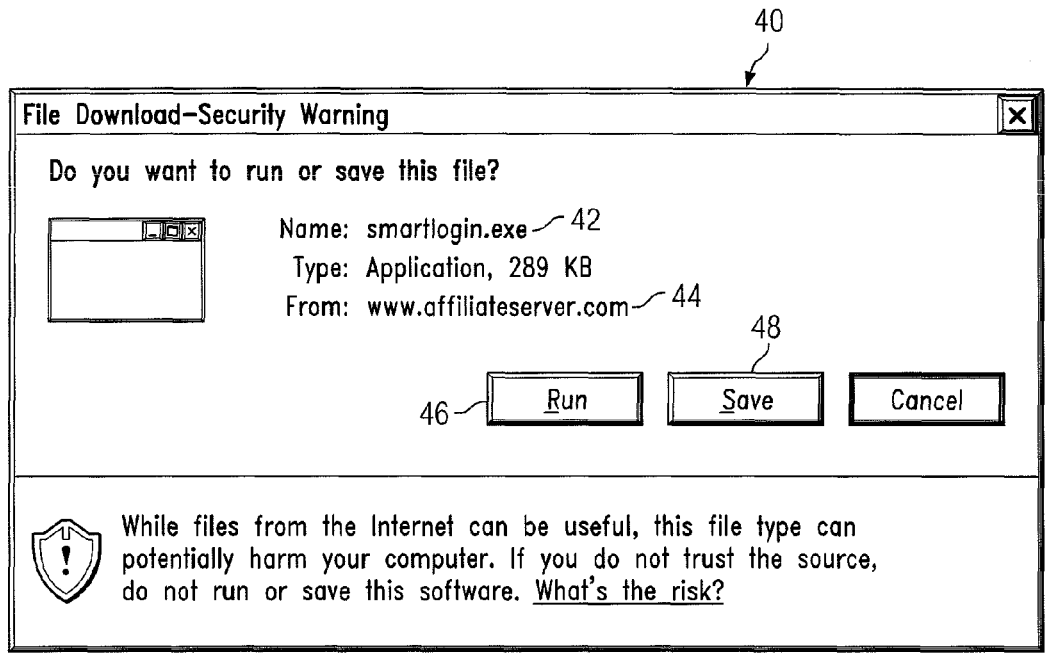
FIGS. 3A to 3F illustrate a sequence of display screen panels appearing during the setup process of FIG. 2.

The following detailed description references the accompanying drawings to illustrate several embodiments of the present invention. The description includes details sufficient to enable a person skilled in the art to practice the invention. It is to be understood that the embodiments depicted and described herein are illustrative of the principles and concepts of the invention and are not to be construed as limiting of the scope of the invention. Accordingly, changes in the embodiments illustrated may be made without departing from the scope of the invention, which is defined by the appended claims.

Introduction

The following description discloses an invention for a method and a system that allows a business entity such as a vendor or service provider to have their logo in the form of an icon or symbol, trademark or trade name, placed on selected taskbars, toolbars, and desktop display screens of the PC or a plurality of PCs of a regular customer or user. The presence of the icon or other symbol enables the customer-user, in a single action at the user PC, to select and directly access (i.e., to login or, alternatively, log-in or log in to) a website or destination web page associated with the business entity when a pointer is placed over the image of the icon or symbol on the display, or any equivalent operation—e.g., by clicking a mouse pointer on the icon or symbol, or by touching an image or a corresponding location on a display. The single action access of the present invention disclosed herein completes all of the necessary steps to access and display the destination web page with only the single action of selecting on the icon or symbol image on the user's computer display. In addition, the single action access may include certain steps performed automatically at the website such as navigating to or opening a particular page on the website such as an order entry form. In the order entry example, the order entry form may even be displayed with most of its fields already filled in for the particular user that accessed the page.

The icon image file and the user identification and password data may be provided in a prior setup process from an executable application called "SmartLogin.exe" originating with SmartIcon Technologies, LLC ("SIT"), and downloaded from a vendor or service provider licensed by SIT. In this example, the icon image file is stored in the user documents section of his or her PC and the user ID and password data is stored in the system configuration registry of the user's PC along with the URL of the vendor or service provider. Selection of the icon launches the browser and completes the connection over the Internet to the vendor website and may include opening a predetermined page of the website to complete entry of an order. As will be explained, the process provided by the SmartLogin.exe application is not a password manager and does not utilize cookies or external databases to complete the connection over the Internet. Further, the process of the present invention is unlike—and lacks a number of features of—applications known as password managers because: (a) it does not use storage space on the user's hard drive or in a database somewhere to store an entire list of user ID and password information that must be encrypted and decrypted; (b) it does not require more than one mouse click or equivalent single action to launch a browser, connect to a desired website and gain access to a desired web page at that website; and (c) it does not require the user to open an application in addition to the browser for the system to commence login.

Moreover, installation of the present invention can be accomplished directly by the user without the intervention of a system administrator and without disruption of firewall or security systems in place on the network utilized by the user. Thus the method and system are very easy to install, simple and reliable, and, after setup, the customer-user need not enter identification, password, or other registration information in order to access a frequently used website. Instead, after selecting the icon, followed by the display of the desired web page, the customer-user only needs to enter information that differs from a previous access to the same page. In this example login has been accomplished merely by selecting the vendor icon with a single mouse click or touch action on a touch pad or display image.

The method and system described herein greatly facilitates such user tasks as order entry for services or goods that are largely repetitive or other tasks where most of the required information is redundant, and enables substantial savings in the time and cost required to complete the task. In one example, which illustrates the advantages, a PC user may be a business that requires frequent daily orders for immediate courier services provided by a particular vendor. The user clicks on the icon, or performs an equivalent action on his or her PC, followed by immediate display of an order entry form for the courier with all fields filled in except for the item description, destination address, and the times for pick up and delivery. Some user actions that are equivalent to clicking on a mouse, as well known to persons skilled in the art, include touching a touch pad with a finger or stylus at a position corresponding to a pointer indicating the icon, touching a touch-sensitive display screen over an image of the icon appearing on the screen, and the like.

Numerous other examples, particularly of applications for business-to-business services, will occur to those skilled in the art. It will also be apparent to skilled persons that the present invention enables substantial savings in labor costs for a typical business user because tasks of this type are processed directly and very quickly. Further, these cost savings are scaled upward and become very substantial for the vendor or service provider associated with the affiliate server. For example, studies by the applicant in a same-day courier service environment have shown that the typical labor cost to complete an order on line using conventional methods is on the order of $1.50 to $1.75 per order per individual user person at the time this is written. Use of the present invention enables this cost to be reduced to ten or twenty percent of this or less. Similarly, the cost savings to the service provider, particularly when operated 24/7, because of the large number of orders received and serviced each day are also reduced to a small fraction. Cutting the costs of these operations is possible because the system and method of the present invention automates the login process to such a degree that fewer persons are required to process such orders. This gain in efficiency is a strong incentive for service providers and their customers to use on-line transactions, instead of phone calls, and to use the SmartIcon method and system instead of conventional on-line methods.

Further, the speed with which the login occurs, with a single click on a vendor name, logo, or icon already being displayed on the desktop, without having to open any other applications, results in a vast reduction in the time necessary to complete the login process. Business users will readily appreciate the potential labor cost savings from the use of the present invention. Moreover, the significance of such savings in labor costs is manifest over time in a faster growing business and much faster customer service. Another significant advantage of the present invention is that business users, and especially service providers and vendors will also readily appreciate the enormous marketing and advertising value of having their vendor name, logo, or icon displayed at all times on the desktop of the business user of their products and services, and thus immediately available for single click access to the vendor's website to place an order, etc.

The icon itself may be a pictorial or graphic figure, a logo, a trademark, or any visible or audible symbol or mark that represents or is associated with a business entity, a product or service, or even an individual. Moreover, as human-computer interface devices evolve, it is contemplated that a single operation performed upon an icon or button or other symbol may be replaced by an equivalent operation upon a different kind of interface device to enable the "one click" single action type of login feature provided by the present invention.

The method and system of the present invention was developed through substantial trial and error experimentation directed toward finding a one-click or single-action type solution to the problem of providing direct access to a website for, e.g., placing an on-line order for the numerous repetitive orders that typically occur during a business day of certain kinds of service provider businesses. As noted herein above, there are a number of methods and systems available for direct access, but they all have deficiencies as discussed above. In addition, a number of solutions were attempted that could accomplish the desired result, but that required the development of so-called "hard coded" applications for installation in the system, required the use of databases or other significant data storage mechanisms, or that involved the use of complex software operations for encryption or to provide numerous ancillary features not essential to the single action login solution. Besides the cost of developing and testing such applications, there was a further drawback in that the application had to be individually tailored for each business user, i.e., each of a potentially very large number of service providers that could benefit from the use of the one-click login concept for efficiently performing the very simple task of entering the same type of order for a service repetitively ordered many times during a business day. Such individual tailoring would be prohibitively expensive for most businesses. Further, one particular problem to overcome during development was the difficulty of providing the needed direct access without it being blocked by various firewalls, antivirus devices, etc. In the context of the present need, efficient business communication between business entities with an established relationship, such devices may be considered superfluous because of the reduced risk of virus infection and the substantial impairment of business efficiency that accompany their use.

Thus, a way was sought to provide the kind of application that could be used by every potential service provider without modification, was also easy to install, used minimal resources on the user PC or in the server systems of the vendors, was transparent to the various firewall and anti-virus devices, and which provided the single action initiation of the method. Consideration of these factors led to the concept of the present invention based on the executable application called "Smart-Login.exe," to be described herein below, which satisfied all of these requirements. Most importantly, the invention provided the very simple and efficient access to enable completing an order entry in a minimum time.

In the detailed description that follows, several generic terms are used in place of names or other descriptors of locations of entities participating in the operation of the method and system of the present invention. There are three basic entities involved, all of which are coupled to a global communications network ("GCN" or "network") such as the Internet. While the term Internet is currently in common use as a generic name for a GCN—a world-wide network of computers and telecommunication devices—it is intended to refer to any such network that may in the future fulfill the same functions and capabilities relied upon today. Thus, although the term Internet may be the present world wide web, and the nodes thereon referred to as websites and the like, other networks and nodes thereon as may exist presently or be developed in the future are susceptible to employing the same principles of the invention disclosed herein.

The first entity is SmartIcon Technologies, LLC, the originator of the method and system of the present invention. An essential component of the method and system is the aforementioned executable application identified as "smartlogin.exe," a software product developed by SmartIcon Technologies, LLC. This software product, necessary for implementing the method and system, is made available under license to business entities such as service providers operating in a particular industry or market segment. Thus, the originator entity will generally be referred to as the "principal." The principal will be manifest as a website presence on the GCN in association with a "principal server."

A second entity is the service provider, similarly manifest as a website presence on the GCN as an "affiliate" in association with an "affiliate server" coupled to the GCN. The typical service provider may also be called a vendor or target company. The affiliate, which may typically operate the method and system under license from the principal, may provide various kinds of repetitively ordered services needed by businesses such as same day courier service (including one or two hour delivery), express and overnight delivery, document copying or handling services, office supplies, etc. Other applications, such as business-to-consumer ("b to c") include food service, airline tickets, video-on-demand, premium content, and the like. The foregoing are just a few of the many possible types of business or other entities such as service providers that may benefit from the use of the SmartLogin method and system described herein. The service provider is thus a destination entity for the third entity—a user or customer of the services of the service provider, which will be designated herein as the user PC. Communication with the website of the service provider is with the associated affiliate server coupled to the GCN. Similarly, the user or customer is manifest on the GCN as the "user PC." The customer, typically a business entity, may be coupled to the GCN through a single PC/browser or through multiple user PC/browser systems. It is contemplated that each user PC typically operates under a limited use sub-license extended by the service provider. Hereinafter, the terms customer-user, customer, and user will be used interchangeably.

In the method and system of the present invention, software was created to operate in two areas. The SmartLogin method utilizes small, simple programs written in such script languages as PHP, Java, HTML, or Perl, which are preferably installed on the principal server at SmartIcon Technologies, LLC. This software interacts with the affiliate server and the user PC when an application software, known herein as the Smartlogin.exe executable application, is installed on the user PC and operated by the person at the user PC. In an alternate embodiment the principal server function and the necessary software could reside at the affiliate server. The Smartlogin.exe may be created using an open source installer for Windows® such as "Inno Setup," a DELPHI-based tool, or its equivalent. The Inno Setup is available online at www.jrsoftware.org. A variety of such installer tools are available for use with various operating systems, as is well known to persons skilled in the art.

Important advantages of the method and system of the present invention thus include: (a) the user is not required to be the administrator of the PC upon which the executable application is installed; (b) the method and system does not use cookies or external databases to accomplish the login; (c) once installed using a simple setup process, the user can quickly access an often used website with a single control operation such as a mouse click; and (d) a significant productivity improvement to both the user and the service provider is realized. The importance of these is that the security features of a business customer's computer network or system do not need to be disabled or are not impaired in any way. The user can install the system herself or himself without assistance. The software is very simple and does not require or occupy large amounts of system memory. Another feature of the invention that results from the use of an executable application running at the user PC to control the login is that, as the method is designed to store the login data in the system configuration registry of the user PC, cross-domain browsing is readily enabled. This permits the interactions between web servers that is necessary for the system to operate with transparency over the Internet.

In summary, the advantages of the present method and system, i.e., of placing a functional icon containing or representing the company brand name or logo on the user desktop, toolbar, or taskbar, ready for instant use to access a service provider with a single action by the user provides at least three important benefits: (a) an effective desktop marketing and advertising tool; (b) an effective productivity improvement tool that minimizes labor costs for both the customer and the vendor in an on-line business-to-business or business-to-consumer transaction; and (c) an enhancement to the ease with which a customer can access web pages of a preferred or often used service provider.

Briefly, the method and system operate as follows. The PC user must have a valid username and password to the desired website, which is entered by the user into the required fields of this application during a setup routine. The smartlogin.exe application then stores the logo corresponding to the desired destination website in the form of an icon in a folder. The folder is located in a user documents file of his or her PC, for example, the user's "My Documents" section of a PC that embodies a Windows® operating system. During the setup process, the logo image is placed in selected portions of the display of the user PC, such as a taskbar, a toolbar and the desktop. These locations are selected to ensure that the icon is visible—and single action access to the desired website represented by the icon is available—at all times the user PC is in use. The .exe application also writes the particular user settings to a system configuration registry of his or her PC, again for example, the Windows® registry keys, under current user settings in a Windows® operating system. This allows for multiple users to share a PC wherein the file for each user's settings includes the correct user information for automatically logging onto the desired website from the particular user PC.

Once the icon has been placed on the user's desktop, task bar, and/or toolbars, a single click on this icon will launch the web browser and connect the user through the Internet to the desired website. When the icon is placed on the desktop display in some computer operating systems, a preliminary mouse click to highlight and select the icon may be followed by the single mouse click to launch the login process. Icons placed in a task bar or tool bar need only be selected once to accomplish the login associated with the icon. Through the use of simple programs running on the website (written, for example, in JavaScript and HTML), the website correctly performs the login for the user to the website. Similarly, these programs can provide email notifications to the service provider associated with the affiliate server of the installation (or removal) of the method and system of the present invention. This notification thus provides a built-in reporting feature via the link to the service provider of the history of each access to the service provider (i.e., the vendor providing the method and system to its customers). This reporting is available whether the report is for an initial installation or for its continued use. In some cases the initial installation may be made as a trial use to satisfy the inquiry of a potential user. The information reported may include the user IP address, the date, time, and number of hits, etc.

In an alternate embodiment, when the system is in use, a service alert feature may be included in the display at the user PC. The alert may appear in a crawling or scrolling text message on the user PC to provide timely weather or delivery-affecting information to the user, for example. The message may be entered by the service provider through a control panel link to a web page on the SmartIcon (principal) server or to a directory at either the principal or the affiliate server.

While the embodiment of the system and method to be described is implemented in a GCN or Internet environment and directed toward repetitive orders for a specific type of service, persons of skill in the art will recognize that the present invention is also readily adaptable to other network environments having a less global scope such as an intranet network in a corporate system, wherein a hierarchy of entities is organized on the network to facilitate business operations. Each entity of what ever class (but will usually be an affiliate) may be represented by an addressable station or terminal or node on the network and include at least one site page or node page—a unit of information content such as an order entry form, a menu of choices, an audio or video program, an article of textual or other printed content, etc.

Detailed Description

Referring to FIG. 1 there is illustrated a system block diagram for performing the method according to the present invention. This block diagram is labeled for describing the setup method detailed in FIGS. 2 through 3F. The system 10 includes a principal server 12, an affiliate server 16, and a user PC 22 representing the three entities in the system 10 that are coupled to and communicate via the Internet 20, one example of a global communications network (GCN). Associated with the principal server 12 is its website 14. This association is indicated by the double line between them. Associated with the affiliate server 16 is its website 18. This association is also indicated by the double line between them. Communication between the websites 14, 18 is indicated by the arrows "C" and "S" to be described. The arrows in FIG. 1 (and in FIG. 4) that are labeled with capital letters indicate communication links that are utilized during the methods to be described. The user PC 22 includes a display 24, a keyboard 26, and a mouse 27 coupled thereto. A CD memory drive 28, installed in the user PC 22, is provided to receive a CD ROM 29. In the illustrative description which follows, the user PC 22 includes the peripheral devices connected to it as described.

Continuing with FIG. 1, the coupling of each of the three entities with the Internet 20 is indicated by several lettered lines having arrowheads attached. Thus, the user PC is attached and communicates via the lines A, E, Q, and U. Similarly, the affiliate server 16 is attached and communicates via the lines B and T, and the principal server 12 is attached and communicates via the lines D and R. The letters are assigned in the sequence in which the communication steps occur, corresponding to the steps of the setup method described in the flow chart of FIG. 2. Thus the setup steps occur in the sequence A, B, C, D, and E, and in the sequence Q, R, S, T, and U as will be described.

Referring to FIG. 2 there is illustrated a flow chart of the setup process performed by the embodiment illustrated in FIG. 1. The setup process involves running an executable application on the user PC 22 that is obtained from an affiliate entity. The affiliate entity is a service provider that is licensed to provide the single action or one-click login method provided by SmartIcon Technologies, LLC, the principal entity. The setup process may begin from a Start block 30, wherein the user PC 22 may be displaying a desktop screen (with a task bar at the bottom edge) or perhaps an open window screen (with a toolbar near the upper part of the screen). Typically, the user PC 22 will launch its browser, such as Internet Explorer 6.0 or its equivalent, to access the webpage 18 of the affiliate server 16, whereupon the affiliate server 16 will forward the connection of the user PC 22 to the webpage 14 of the principal server 12 to obtain the executable application. In the system block diagram shown in FIG. 1, the executable application may be represented by the CD ROM 29. Upon copying the downloaded executable application smartlogin.exe from the principal server 12 to the user PC 22, or inserting and loading the executable application from the CD ROM 29 obtained from the principal entity, a window as illustrated in FIG. 3A, designated as screen 40, appears on the display 24 of the user PC 22.

Figure 3B:
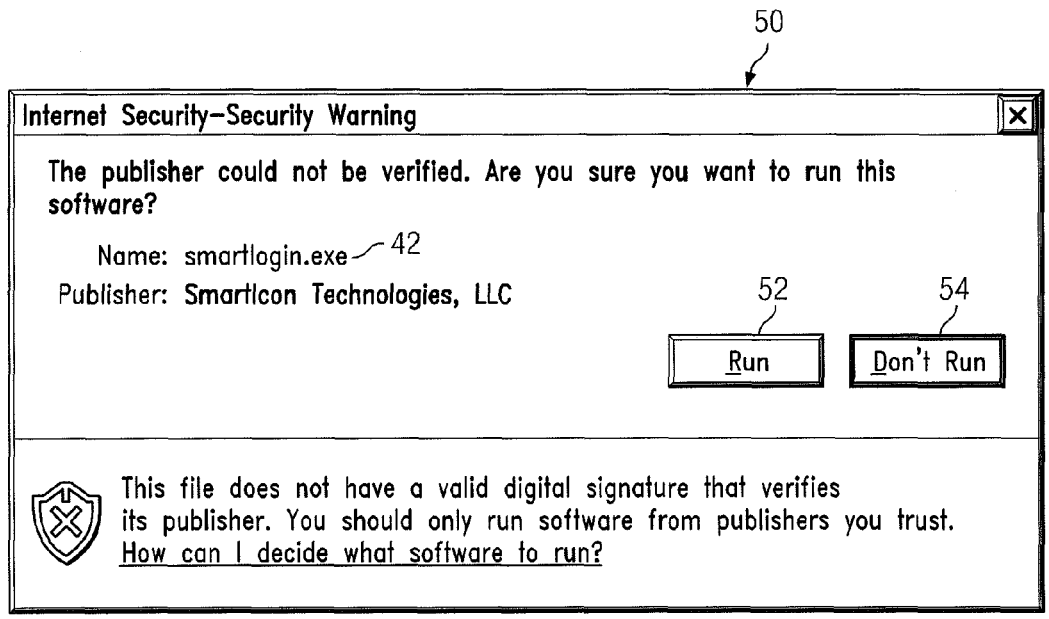

Referring to FIGS. 3A to 3F there are illustrated a sequence of display screen panels, i.e., "screens," appearing at the user PC 22 during the setup process of FIG. 2. Each screen in the sequence of the FIGS. 3A through 3F will bear a separate reference number. Screen 40 in FIG. 3A illustrates a first screen that enables the user PC 22 to prepare to load the executable application. The executable application is denoted by its name "smartlogin.exe 42" on the screen 40. The type of file is shown as "Application, 289 KB," and the source of the file is shown as "www.affiliateserver.com 44." Below these entries on the screen 40 are several control buttons by which the user PC 22 may select whether to "Run 46" or "Save 48" the file identified by the reference number 42. Upon selection of one of the buttons 46, 48 the next screen 50 illustrated in FIG. 3B provides an opportunity to run the setup application by selecting or clicking on the "Run" button 52. Alternatively, the user PC 22 may abandon the setup from the user PC 22 by selecting or clicking on the "Don't Run" button 54. Selecting the "Run" button 52 is followed by display of the screen 60 illustrated in FIG. 3C.

Figure 3C:
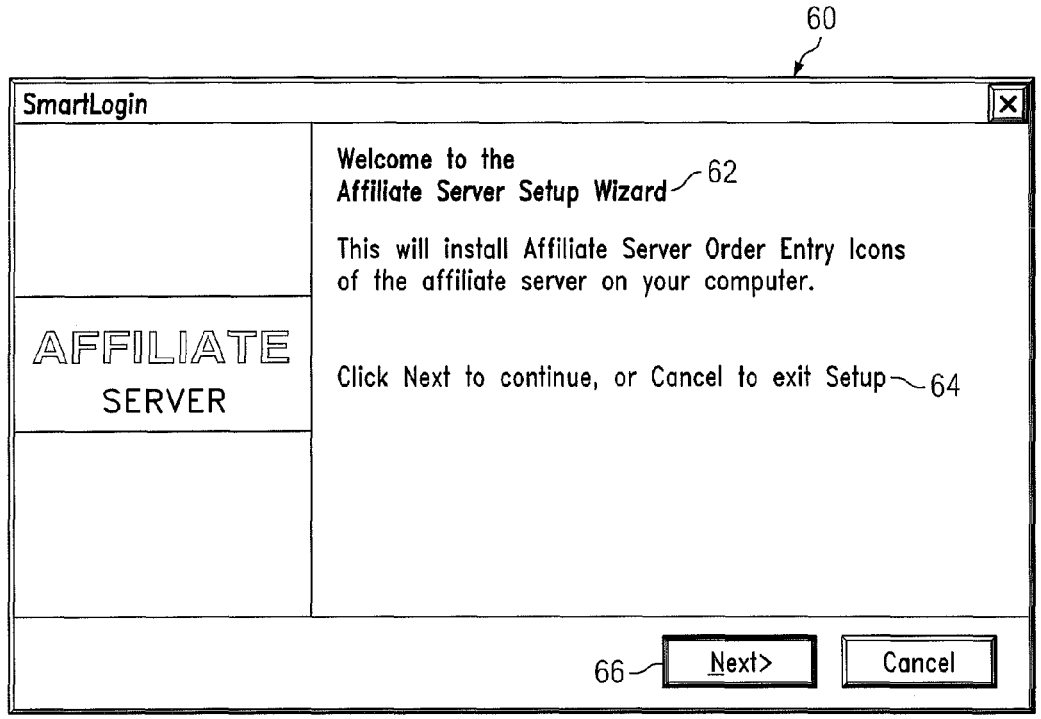

In FIG. 3C, there is illustrated a welcome screen 60 provided to identify the affiliate entity represented by the affiliate server 16 (and the corresponding webpage 18) and the Smart-Login setup wizard 62. From this screen, the user PC 22 may follow an instruction 64 to initiate the installation of the SmartLogin order entry icons of the affiliate server 16 on the user PC 22 itself by clicking on the "Next" button 66. Alternatively, the user PC 22 may cancel the setup process by clicking on the "Cancel" button shown to the right of the "Next" button 66 in the screen 60.

Figure 3D:
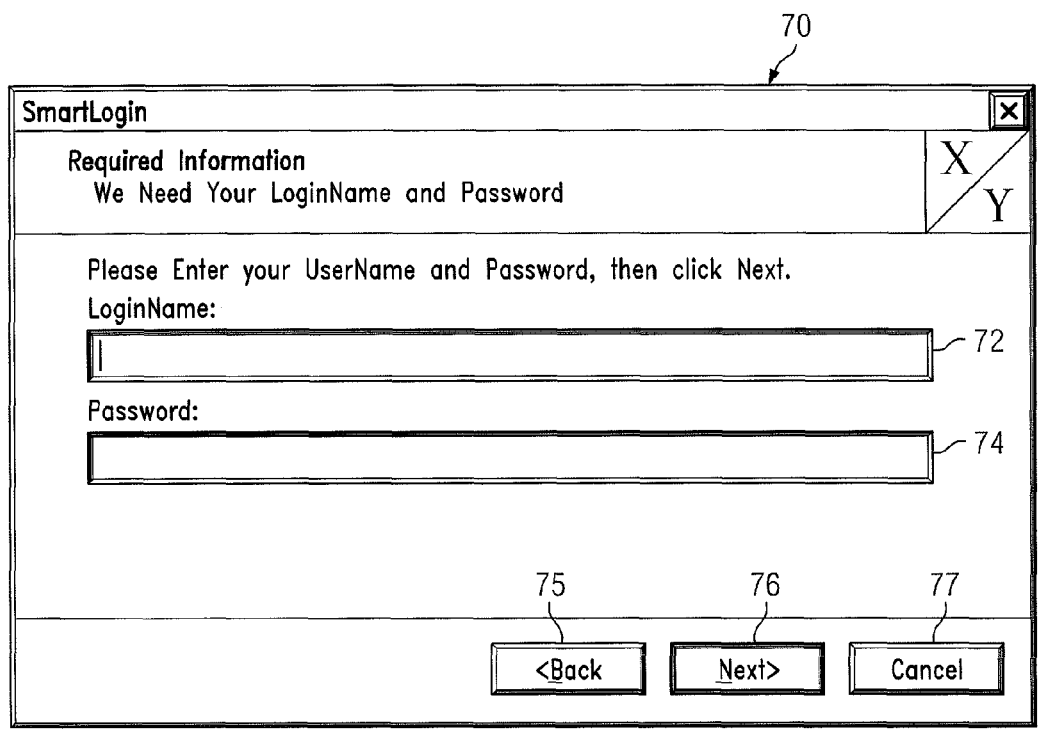
Figure 3E:
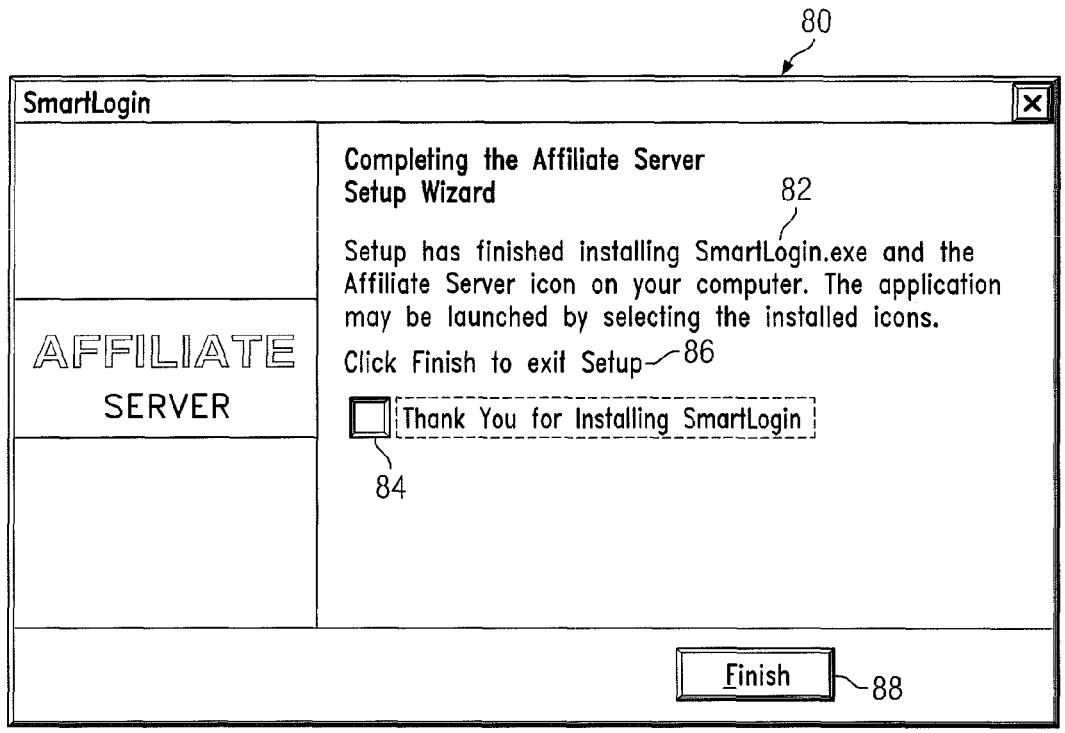
Figure 3F:
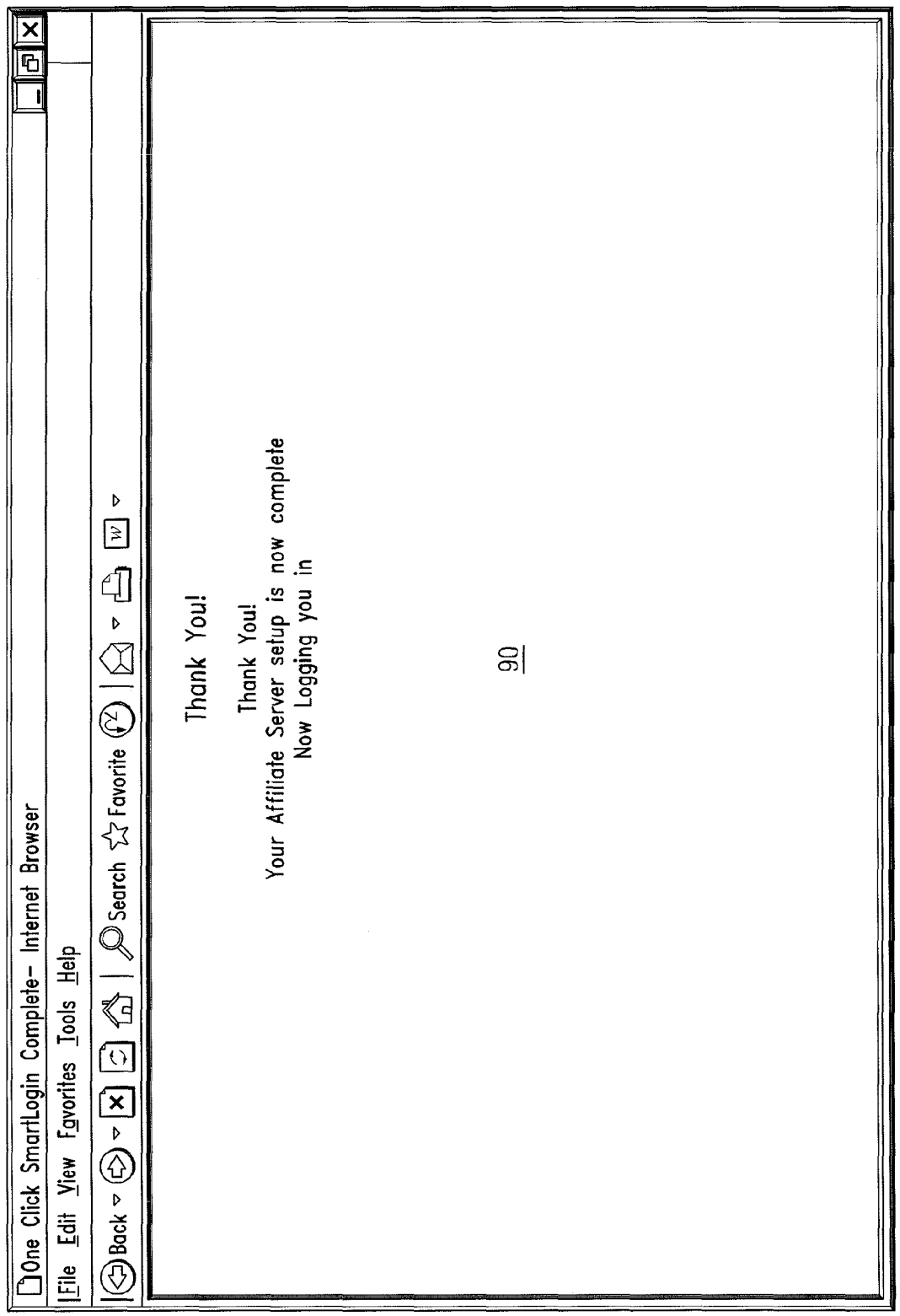

When the "Next" button 66 is selected, the next screen to appear is the screen 70 illustrated in FIG. 3D for entering registration information such as the "LoginName" 72 and the "Password" 74. Entry of this information at the keyboard 26 is followed, for example, by using the mouse to select the "Next" button 76 in the screen 70 if the user PC 22 decides to proceed. Buttons are also provided on screen 70 to select "Back" 75, or to "Cancel" 77. Selecting the Next button 76 on screen 70 results in the display of a user license (not shown, as the text is not pertinent to the invention disclosed herein), a standard feature of software applications. As contemplated by the applicant, the user license may be a limited use license granted for the limited purpose of the single action login to a designated website. The user may accept the terms and conditions of the license and proceed to complete the setup process by selecting a button labeled "I Accept." Alternatively, if the user elects to not accept, this decision is indicated by selecting a button labeled "I Do Not Accept" and the setup process is discontinued. Upon acceptance, the setup flow proceeds to FIG. 3E. In screen 80 illustrated in FIG. 3E the user PC 22 is informed in the message 82 on the screen 80 that the SmartLogin setup wizard has finished the installation of the smartlogin.exe application and the SmartLogin icons on the user PC 22. A "Finish" button 84 is provided for the user PC 22 to complete the setup, acknowledge the installation of the SmartLogin application and icon, and exit the setup process by selecting the Finish button as instructed at the exit message 86. Thereafter, a "Setup Complete" window screen 90 appears on the user PC 22 as illustrated in FIG. 3F.

Returning to FIG. 2, the flow chart for the process represented by the screens of FIG. 3A through 3F will be described, including the essential operations being carried out at each step shown in FIG. 2. It should be noticed that the lower two lines of text in each of the boxes representing the steps of the method contain keys to other drawings herein. One line identifies the relevant screen illustration(s) that appears in one of the FIGS. 3A through 3F, by its reference number 40, 50, 60, 70, 80, or 90. The bottom line refers to a communication path among the three entities in the network of the system 10 shown in FIG. 1, by its identifier, the letters A, B, C, D, E or P, Q, R, S, T, or U.

Thus, in step 30, the operations carried out are illustrated in screens 40 and 50 through communications occurring over paths or links A, B, C, D, E and P. From a user PC 22, which in this illustrative example should be a Windows® PC with Internet Explorer 6.0 or later browser, the browser is launched and a connection established via links A and B to a designated web server. In this example the designated web server is the affiliate server 16, through which the user PC 22 may obtain the smartlogin.exe application (i.e., the "executable," which may also be referred to herein as the ".exe"), either downloaded over the network 20 or via a separately shipped CD ROM or other portable storage device, from the source. The source is the principal, in this case SmartIcon Technologies, LLC, represented by the principal server 12 and its website 14, and accessed via the link C in FIG. 1. If the smartlogin.exe is to be downloaded to the user PC 22, that will occur via the links D and E in FIG. 1. Alternatively, the smartlogin.exe may be separately shipped to the user PC 22 via the link P, shown as a dashed line in FIG. 1. The user PC 22, upon receipt of the executable, may select and run the executable (double click the executable) or save it for later use.

In selection of step 32, "Create Directory on PC in User Docs," the smartlogin.exe 29 begins to run and creates a designated directory in the user documents file of the operating system for the user PC 22. In a Windows® XP environment this is called the "My Documents" section of the user PC 22. In the more recent Windows® "Vista" environment, this section would be called simply "Documents." This location allows for any Windows-based PC to install icons on the user PC 22 without having to use or be the system PC Administrator. Please refer also to screen 60 and the links A or P of FIG. 1.

In selection of step 34, "Enter Username and password," associated with screen 70 and the links A or P of FIG. 1, the username and password information, which may be supplied by the service provider associated with the affiliate server 16 or by the person operating the user PC 22, is entered by the person installing the .exe.

Proceeding to the next step 36, associated with screen 80 and the links A or P, several operations are performed to install the necessary files in the user PC 22 to complete the setup process. One operation is to create registry keys and domain names to be written by the .exe into the system configuration registry, which is known as the "Windows Registry" in a Windows® environment. Included is the URL of the destination website 18 at the affiliate web server 16, and, optionally, the URL of SmartIcon Technologies' website that may be written into the system configuration registry, along with the privacy sites and/or trusted sites settings of the browser. Second, operations are performed to create and label the icons to be installed on the desktop, taskbar, and toolbar displays, and write them into a file in the user documents section of the user PC 22, such as the "My Documents" file of a "Windows®" PC.

Placements of the icons on the display of the user PC 22 are selected so that an icon is visible and accessible at all normal times the user PC 22 is in use, to permit an immediate single action connection from the user PC to the affiliate website 18. Thus, in the illustrative example described herein, the locations selected are the desktop, the taskbar, and a toolbar of (typically) the most often used application, the web browser, on the user PC. The desktop display is an obvious choice because nearly all computing devices have some sort of a desktop or "home" page display. Similarly, the taskbar at the bottom of the screen is a logical choice because it can accommodate selection buttons for the current tasks the user PC is undertaking. One example, which may be utilized in the present invention, is to insert the icon in the "Quick Launch" location or the system tray available on the taskbar. Further, because most user PCs 22 are often in an application that includes email communication, the toolbar of such application—e.g., "Outlook" in a Windows-equipped PC—is a logical choice for the display of an icon for use with the present invention. Persons skilled in the art will readily understand that other choices of location for the icons could be made. Completion of step 36 is followed automatically by step 38 to "Launch Web Browser." This step is associated with screen 90 and the links E and Q, R, S, T, and U of FIG. 1.

In step 38, several operations are carried out to complete the setup process of the present method and system and launch the web browser to initiate login to the service provider at the affiliate server 16. First, the web browser at the user PC 22 is linked to the installed web page 14 "installed. HTML" on the principal server 12, where the web page 14 collects the username, the password, and the system user name from the address bar, all of which are embedded in the URL transmitted by the browser at the user PC 22. Second, the IP address, the date and time are also collected by routines (e.g., written in JavaScript or PHP, etc.) running on the principal server 12 and then forwarded to the affiliate server 16 associated with the service provider to complete the setup. Third, an email is generated to the service provider (affiliate) to communicate that the installation of the .exe and the setup are complete. At the end of this step 38, the login process begins automatically, as will be described in detail below in conjunction with FIGS. 5 and 6A through 6E. The setup process only needs to be completed one time for each user PC. In an alternative environment to the set up process just described re: FIG. 2, the user is presented with a test page for a license agreement (not shown, as such a step is well known to the industry and will not be further illustrated) containing terms and conditions of use and the opportunity to not accept the terms and conditions, or to accept and complete the set up process and initiate the login to the service provider.

Figure 4:
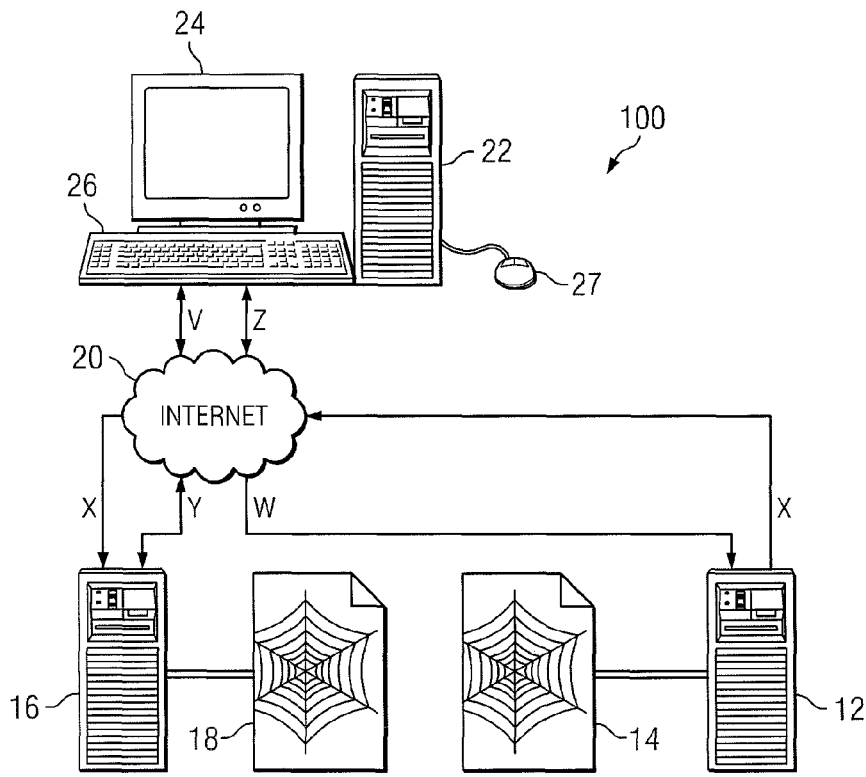
FIG. 4 illustrates a system block diagram for a single click login method according to the present invention.
Figure 5:
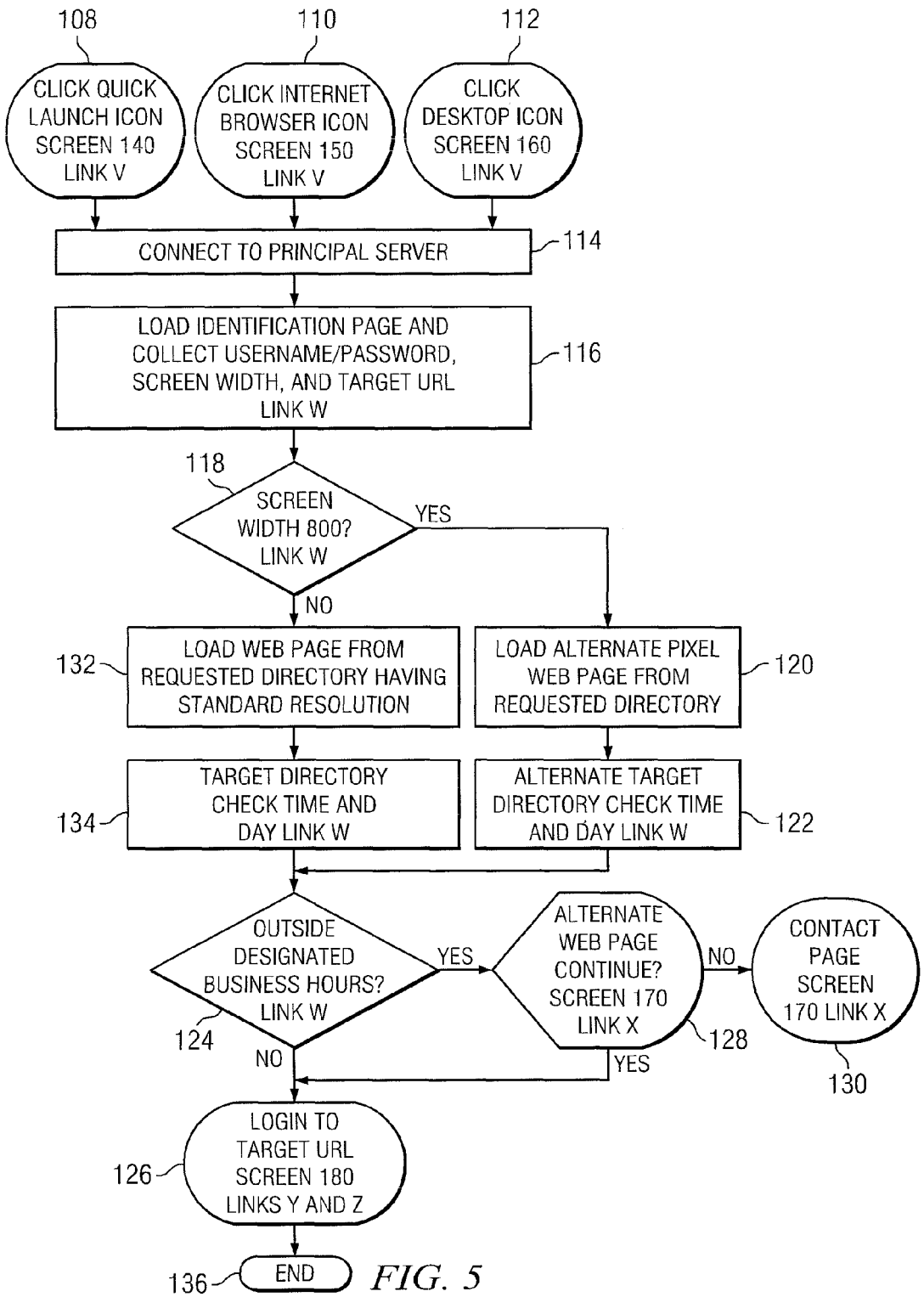
FIG. 5 illustrates a flow chart of the single click login process performed by the embodiment of FIG. 4.

Referring to FIG. 4 there is illustrated a system block diagram for providing a single action login method according to the present invention. It will be noted that this is essentially the same system as illustrated in FIG. 1 except that it is labeled to reflect the links required for the steps of the login process detailed in FIGS. 5 through 6E. While the format of FIGS. 5 and 6A through 6E to be described herein below is similar to that of FIGS. 2 and 3A through 3F, the illustrated process for login is different from the setup process. FIG. 5 illustrates the steps of the method and FIGS. 6A through 6E illustrate the screens 140 through 180 that accompany the login process.

Returning to FIG. 4, these links V, W, X, Y, and Z become active in sequence when the user PC 22 begins the process of a single action or one-click login according to the present invention by selecting or "clicking" or touching upon an icon displayed on the desktop or on a toolbar or taskbar of the user PC 22. Briefly, selecting the icon launches a web browser at the user PC 22 via link V and completes a connection to the principal server 12 via the link W. The principal server 12 determines the URL of the affiliate server 16 and forwards the request thereto to login, followed by establishing a connection to the affiliate server 16 via the link X. Thereafter, communication between the user PC 22 and the affiliate website at 16 is facilitated via the links Y and Z.

Figure 6A:
FIGS. 6A to 6E illustrate a sequence of display screen panels appearing during the single click login process of FIG. 5.

Referring to FIG. 5 there is illustrated a flow chart of the single click login process performed by the embodiment of FIG. 4. After completing the setup process, the login process begins with selecting an icon that appears on the display 24 of the user PC 22. As described herein above, the icon may be placed in one or any of several regions of the displayed screens. At step 108, from screen segment 140 illustrated in FIG. 6A, a click on the icon 142 placed on a "Quick Launch" taskbar, as provided in a system having a Windows® operating system as in the present example, will initiate the login process by launching the browser. Experienced users will observe that FIG. 6A illustrates a segment of a PC desktop display, thus enabling a single-click selection of an icon from the desktop. The icon 142 in FIG. 6A is shown as the symbols X/Y enclosed within a box outline. This representation of an icon will be used in the following description. The symbols X/Y could represent the initials of a service provider's name, or any iconic figure or logo, etc. that is associated with the affiliate service provider.

Continuing with FIG. 5, step 108 is followed by step 114, to connect the user PC 22 to the principal server 12 via the link V shown in FIG. 4. Alternatively, at step 110, from screen 150 illustrated in FIG. 6B, a selection or click on the icon 152 placed on a toolbar in a window of an open application, as may be provided in a system having a Windows® operating system as in the present example, will initiate the login process by launching the browser. Step 110 is also followed by step 114, connecting the user PC 22 to the principal server 12 via the link V shown in FIG. 4. Alternatively, at step 112, from screen 160 illustrated in FIG. 6C, a selection or click on the icon 162 placed on the desktop display itself, as may be provided in a system having a Windows® operating system as in the present example, will initiate the login process by launching the browser. Step 112 is followed by step 114, connecting the user PC 22 to the principal server 12 via the link V shown in FIG. 4.

In FIG. 5, the connection to the principal server 12 in step 114 is followed by step 116. As mentioned in a preceding paragraph, the principal server 12 determines the URL of the affiliate server 16 and forwards the request to login to the affiliate server 16, followed by establishing a connection to the affiliate server 16 via the link X. Thereafter, communication between the user PC 22 and the affiliate website 18 at the server 16 is facilitated via the links Y and Z. In step 116, the web browser loads the identification page located at the principal server 12 to collect the username, the password, and the target URL, i.e., the URL of the website 18 of the affiliate server 16. Optionally, the screen width data of the display 24 at the user PC 22 may also be transmitted. The communication accomplished in step 116 occurs via the link W.

In the simplest of systems, the flow could proceed from step 116 directly to the step 126, whereupon the login of the user PC 22 to the affiliate server 16 and its associated website 18 takes place, accompanied by the display of the web page such as an order entry form of the affiliate service provider, and ending at step 136. However, as illustrated in the flow chart of FIG. 5, some additional steps are provided between the steps 116 and 126 to enhance the utility of the method and system to the user PC and to the service provider. Following the step 116 is a decision step 118, which tests whether the screen width of the display 24 of the user PC 22 is 800 pixels? Since most user PCs are equipped with displays having a standard horizontal screen resolution greater than 800 pixels, those displays will have no difficulty displaying the entire destination web page. However, use of displays having 800 pixels will find it necessary in many cases to scroll left and right to view the entire content of the destination web page. Therefore, the test step 118 is provided to enable the destination web page converted to the 800 pixel format to eliminate the need for the back-and-forth scrolling. If the query in step 118 is affirmative, the flow proceeds to the step 120 to load the alternate web page having a screen width of 800 pixels from the requested directory at the affiliate server 16 onto the displayed page at the user PC 22. The action in step 120 may be provided with an HTML or JavaScript file residing on the affiliate server 16.

Step 120 is followed by a step 122, also controlled by a JavaScript file, where the system compares the time of the user PC request with the business hour schedule of the service provider associated with the affiliate server 16. In the next step, at step 124, if the user request to login is outside designated business hours, the login process is stopped while the system checks whether the request is made outside business hours. If so, the flow proceeds to step 128. Step 128 is another test step to determine whether to advance to another web page? If not, the flow proceeds in step 130 to a web page illustrated at screen 170 via the link X, which provides alternate contact information to the user PC 22. If, however, the service provider has not provided contact information or an alternate web page destination, then the flow continues per the original URL to login to the affiliate server 16 and the web page (as in screen 170) associated with website 18 in step 126. Upon login to the affiliate website 18, the process ends at step 136.

Returning to step 118, which tested whether the horizontal resolution (screen width) of the user PC display is 800 pixels, the flow advances to step 132 if the determination is negative. Subsequently, in step 132, the destination web page is loaded from the requested directory onto the user PC 22. In the following step 134, the system compares the time of the user PC request with the business hour schedule of the service provider associated with the affiliate server 16, just as in the step 122 described in the preceding paragraph, which then leads to step 124 as explained and the remaining steps of the login process illustrated in FIG. 5.

Figure 6C:
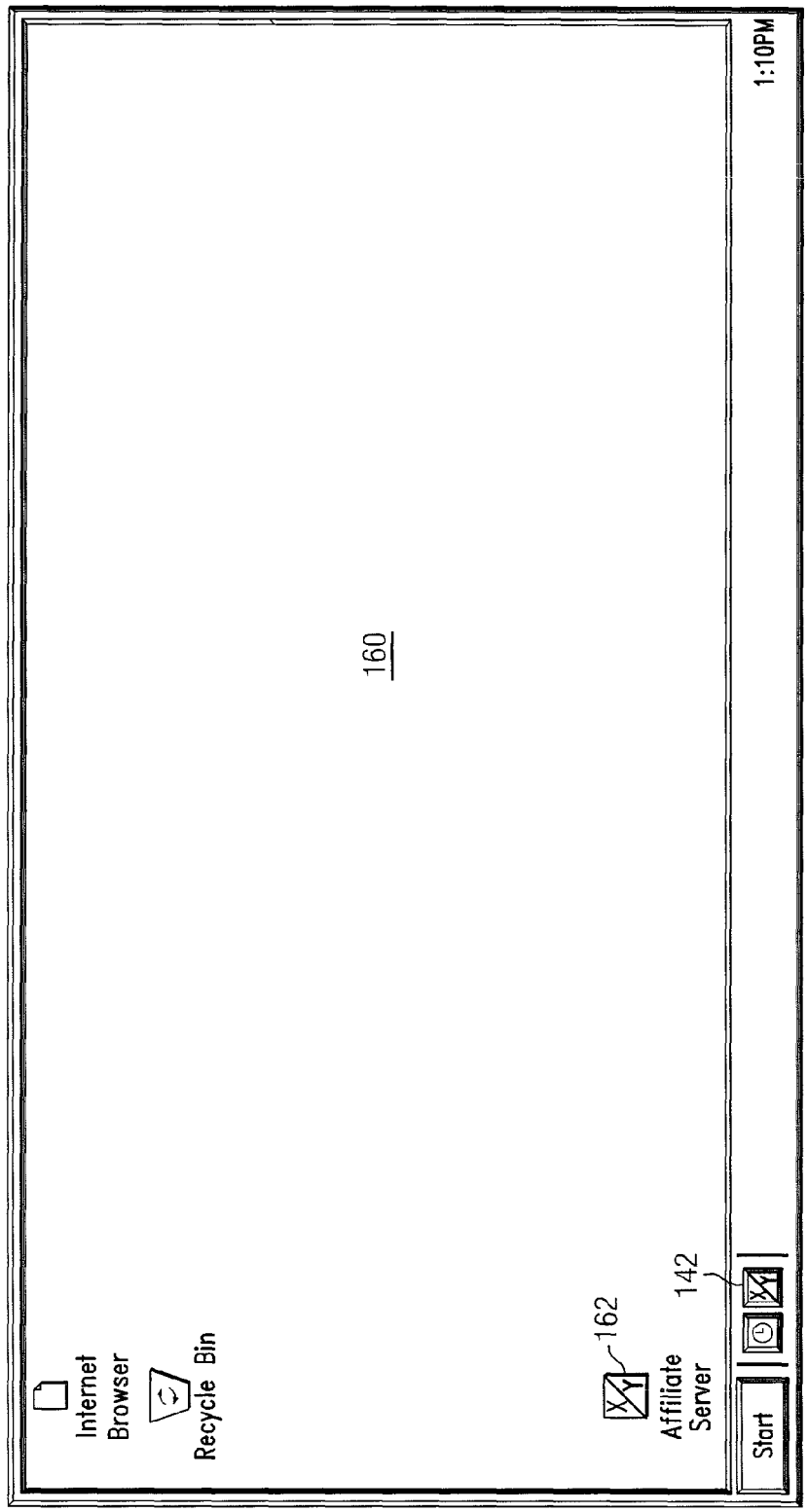
Figure 6B:
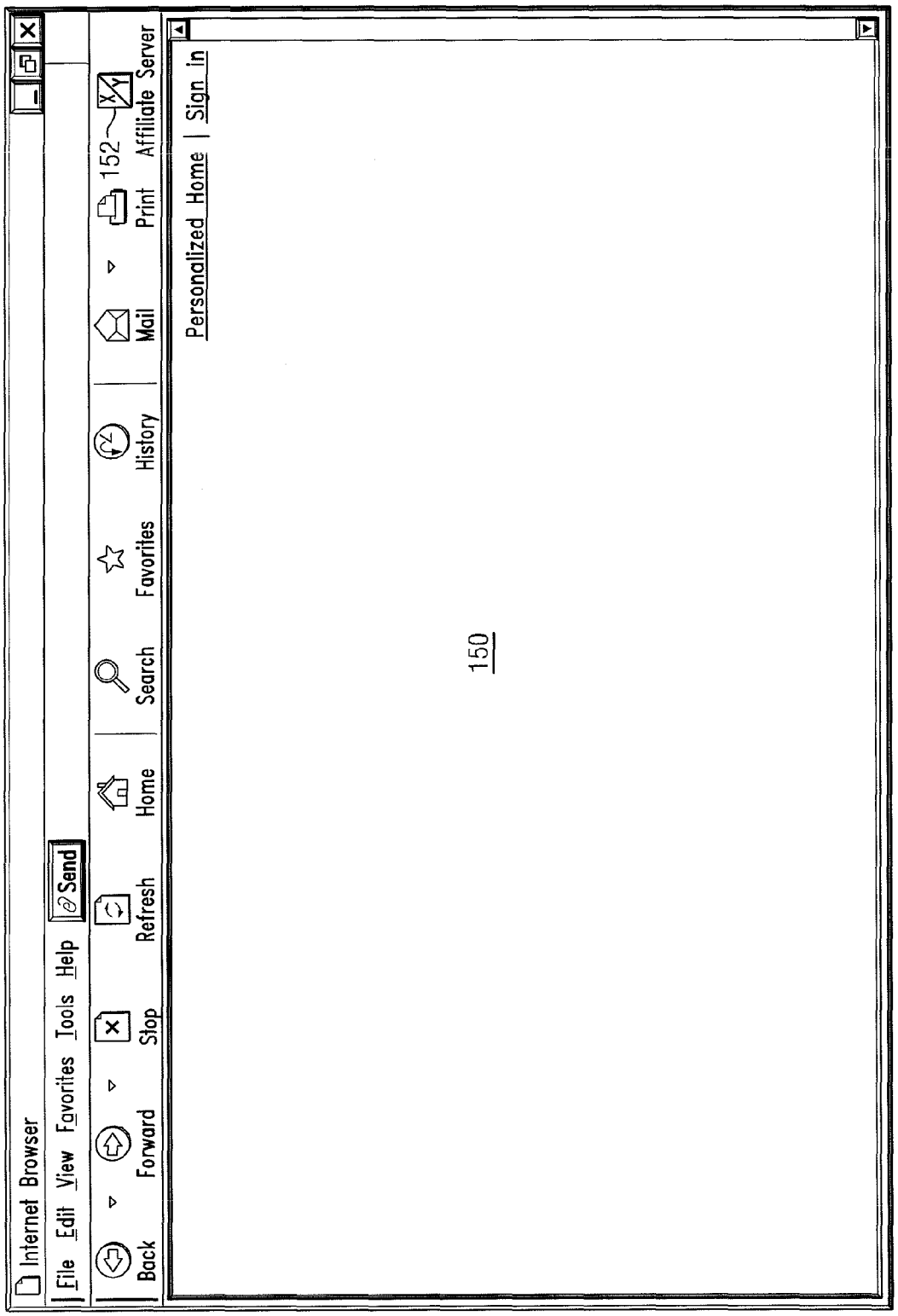

Referring to FIGS. 6A to 6E there are illustrated a sequence of display screen panels appearing during the single action or single click login process of FIG. 5. FIGS. 6A, 6B, and 6C are, respectively, illustrations of the display 24 of the user PC 22 for a task bar (such as a "Quick Launch" task bar at the bottom or other edge of the desktop in a Windows® environment), a toolbar in a window of an open application, and a desktop of a user PC 22 operating in a Windows® environment. In the FIGS. 6A, 6B, and 6C, the icons are denoted by the reference numbers 142, 152, and 162 respectively. In each case the setup process previously described installed an icon on the respective portion of the display of the user PC 22, to be utilized in a single action or a one-click login process to a predetermined web page of the website 18 of a service provider associated with an affiliate server 16, as shown in FIGS. 1 and 4. The screen panels of FIGS. 6A, 6B, and 6C respectively represent three possible login thresholds in a typical user's PC environment. In use, the user merely needs to place the pointer of a mouse or equivalent device over the image of the icon 142, 152, or 162 on the display 24 and touch or click on the selected location to launch the login process. Whichever location is selected results in the same action represented by the step 114 to connect to the principal server 12 (See FIG. 4) to enable login to the service provider at the affiliate server 16.

Figure 6D:
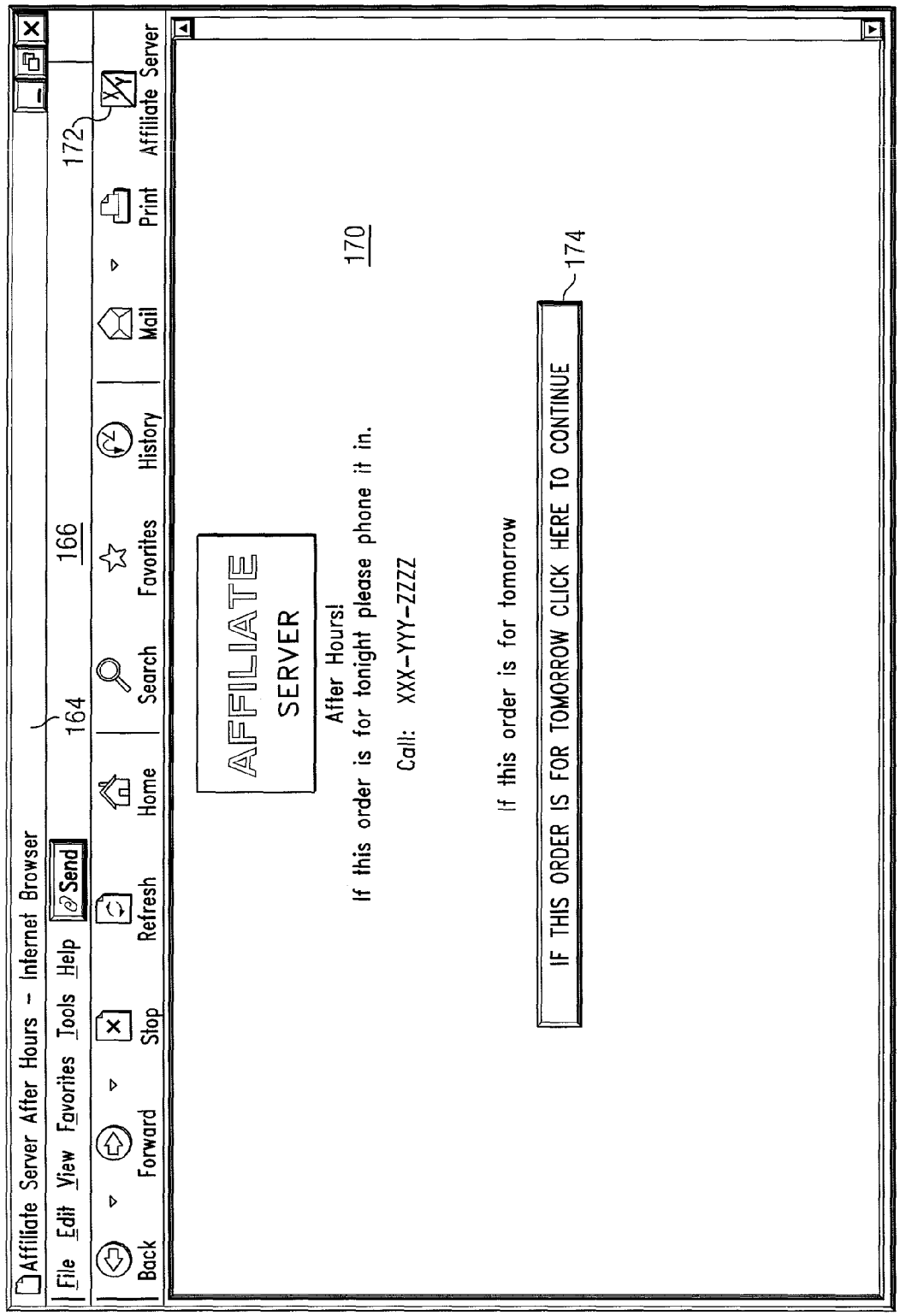

FIG. 6D illustrates the screen 170 that appears when the login attempt was made after the normal business hours of the service provider. Typically, the screen 170 may have the service provider's identity and contact information shown thereon, perhaps including a message or instruction about login after hours. Included in the figure are the icon 172 for the affiliate server in the toolbar of this open application panel and, as an example, an instruction to the user regarding placing the order at a later time if it is needed for a particular user.

Figure 6E:
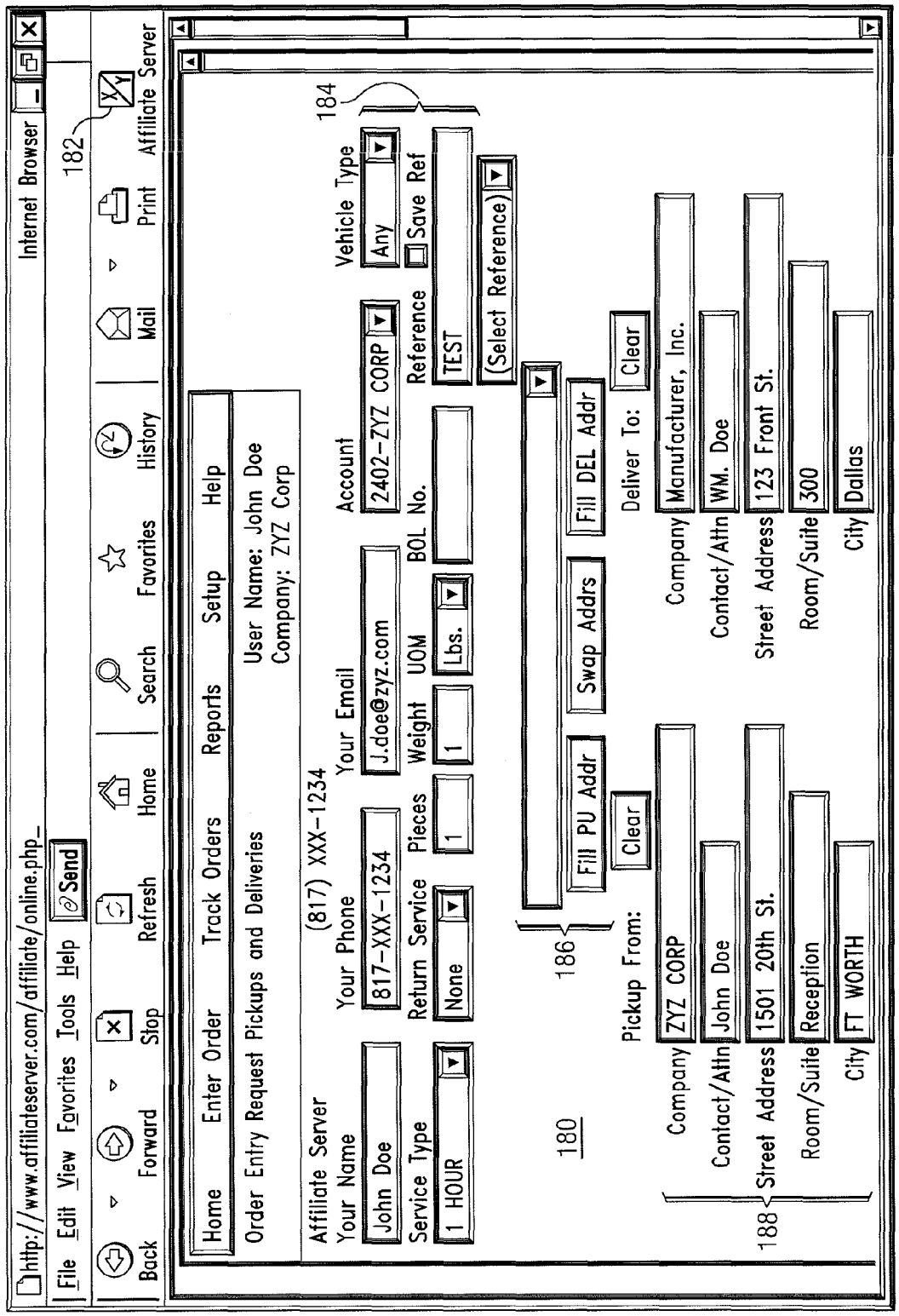

FIG. 6E illustrates an order entry screen 180 for a service provider, in just one example of a destination reached using the single action login method. Here, a form for entering an order for courier service is illustrated. The courier service's icon is shown in the toolbar at reference number 182. Several regions of the displayed screen may be provided to partition the data necessary to complete entry of an order. In an upper portion of the screen, indicated by the bracket 184, information about the user or customer may appear on the display. FIG. 6E illustrates one of the best uses of the method and system of the present invention—to access an order entry page from a user PC display with only one user action being required—a single click, or is equivalent such as a touch upon a touch pad or displayed image, etc. For a business needing courier services repetitively during a business day, the efficiency of the login and re-ordering process provided by the present invention can substantially improve productivity and reduce costs of this task for the business.

The enabling elements of the present invention are mostly embodied in the Smartlogin.exe executable application designed for implementing the steps of the one-click login process in conjunction with several simple scripts running on the principal server 12. The .exe application is short and simple because lengthy code is not required to provide the efficient processes of the present invention. The .exe application basically accomplishes three simple functions that facilitate the method in a system of three entities coupled to a GCN such as the Internet or other network of similar entities. The three functions are: (a) to launch a browser over the network; (b) to provide the necessary communication links via the network among the three entities; and (c) to provide the log in information from the user PC or telecommunications device to the affiliate server via the principal server.

Alternate Embodiments

While the invention has been shown in only one of its forms, it is not thus limited but is susceptible to various changes and modifications without departing from the spirit thereof. For example, while the embodiment of the system and method described herein above is implemented in a GCN or Internet environment and directed toward repetitive orders for a specific type of service, persons of skill in the art will recognize that the present invention is also readily adaptable to other network environments having a less global scope such as an intranet network in a corporate system, wherein a hierarchy of entities may be organized on the network to facilitate business operations.

In another example, while the embodiment of the system and method described herein above is implemented using a personal computer running a Windows® operating system (or on any equivalent personal or business computer running a suitable operating system), persons of skill in the art will recognize that the present invention is also readily adaptable to other kinds of computing or telecommunication devices that employ operating systems and application programs that enable the "user PC" or equivalent device to connect to—i.e., launch a connection upon—a network of computing and/or telecommunication devices that can fulfill the functionality of the principal and affiliate servers. Thus any such device having the capability of the computing device apparatus and methods to function as described herein may practice the present invention. The term "user PC" as contemplated herein encompasses all of these possibilities.

Further, While the embodiment of the present invention described herein illustrates the single action to initiate the login process as a "one click" operation of a mouse or other like peripheral connected to a user PC, the invention is susceptible of equivalent implementation by employing a touch-sensitive display screen that both displays the icon of the service provider and enables the selection of the single action login by responding to the touch of a person's finger or of a stylus to the portion of the display exhibiting the image of the icon. Moreover, the touch-sensitive screen may be a portion of a personal computer, a laptop computer, a cellular telephone, a personal digital assistant, or any other computing and/or telecommunication device that is so-equipped. The computing or telecommunication device may be located in an office, carried with a person, embodied in a small, wearable or portable configuration, mounted in a vehicle or aircraft, etc. The touch sensitive portion of the device may be configured to be other than a portion of the display and may even be a dedicated button, actuator, or switch or other pressure sensitive part of the "user PC." One example of an actuator is the so-called "track wheel" used on handheld devices, wherein the track wheel may be rotated to highlight an icon and pressed to select or open an item or a menu represented by the icon. The term "user PC" as contemplated herein encompasses all of these possibilities.

In other embodiments, the icon may be a visual symbol, image, or artifact, textual or graphic, or it may be an audible symbol, sound, or signal, spoken or musical or non-musical, emitted by an annunciator device in or connected to the user PC. The term "icon" as contemplated herein encompasses all of these possibilities.

Further, numerous other examples of applications for business-to-business and business-to-consumer services will occur to those skilled in the art, particularly those that rely on repetitively ordered products or services via the Internet or other network. Variations in the icon itself may be appropriate, such as a pictorial or graphic figure, a logo, a trademark, or any symbol or mark that represents or is associated with a business entity or product or even an individual. Moreover, as human-computer interface devices evolve, a single operation exercised upon an icon or button or other symbol may be replaced by an equivalent operation upon a different kind of interface device to enable the single action or "one click login" feature provided by the present invention.

Thus, an affiliate entity as defined herein, which may operate the method and system under license from the principal, may provide various kinds of repetitively ordered services needed by businesses such as same day courier service (including one or two hour delivery), express and overnight delivery, document copying or handling services, office supplies, etc. Other applications, such as business-to-consumer ("b to c") include food service, airline tickets, video-on-demand, premium content, and the like. Products such as fast foods frequently ordered can be conveniently ordered using the present invention. Such uses of the invention for ordering specified products or entertainment or premium content, etc. may be facilitated from a displayed graphic on a destination web page representing a menu of choices, for example. The present invention thus facilitates the productivity of a destination entity—a vendor or service provider—in responding to the needs of its customer and its services or products.

Although it has been stated that security of login data is nota principle for a substantial number of potential users of the single action login system and method disclosed herein, there is an important class of potential users that require provision for the security of user data in online transactions. Security of data is often necessary in business transactions, particularly where credit card account data or other sensitive or personal identification information is transmitted through a network. One example of a protocol for securing data transmissions is the well-known Payment Card Industry Data Security Standard, or "PCI standard." The PCI standard is recognized and often required by many businesses conducting transactions in the on-line environment. Thus, it would be advantageous if the single action log-in system and method disclosed herein included an embodiment incorporating encryption of log-in information. Importantly, the alternate system and method would preserve the advantages of avoiding the use of cookies, file managers, external databases, or the services or permission of IT administrators to install the system and method.

Accordingly, recognizing that this need exists for a system and method for automatic login with a single action that also provides for encrypting the login information, an alternate embodiment of the method is disclosed including encryption of the login information during installation of the system. In a preferred embodiment, the system incorporates additional steps into the method performed at the user PC to install or set up the system. Following entry by the installer (usually the user) of the user's login credentials (e.g., application identification number, version number, username, password, etc.) this data may be encrypted at the user PC using an elementary or "first level" encryption algorithm. One example is a symmetric encryption algorithm such as the well-known "XOR," an algorithm that uses the XOR operator—a single bit stream—to encrypt and decrypt the designated information using the same key. The XOR—encrypted information is then sent to the affiliate server to prepare an encrypted token that will be used during the actual login in response to the single action performed by the user to initiate the login. The encrypted token may be encrypted using a more robust "second level" algorithm. One example of a more robust algorithm is a symmetric algorithm that employs a variable length key such as the Blowfish algorithm, which employs a block cipher. The encrypted token may be thought of as a data packet containing the encrypted data that will be decrypted at the destination—the affiliate server—to open the packet and complete the login process when the user executes the single action on the user PC. The link to the affiliate server to perform the encryption during the set up process is provided so that the encryption key is hidden on the server and not in the installer PC. Though not required, in some user installations this link may be provided to take advantage of greater processing power that may be present at the affiliate server to perform the complex operations involved in processing the relatively large block cipher that may be used with the Blowfish algorithm. This process returns the encrypted token to the user PC for use during the single action login.

Figure 7:
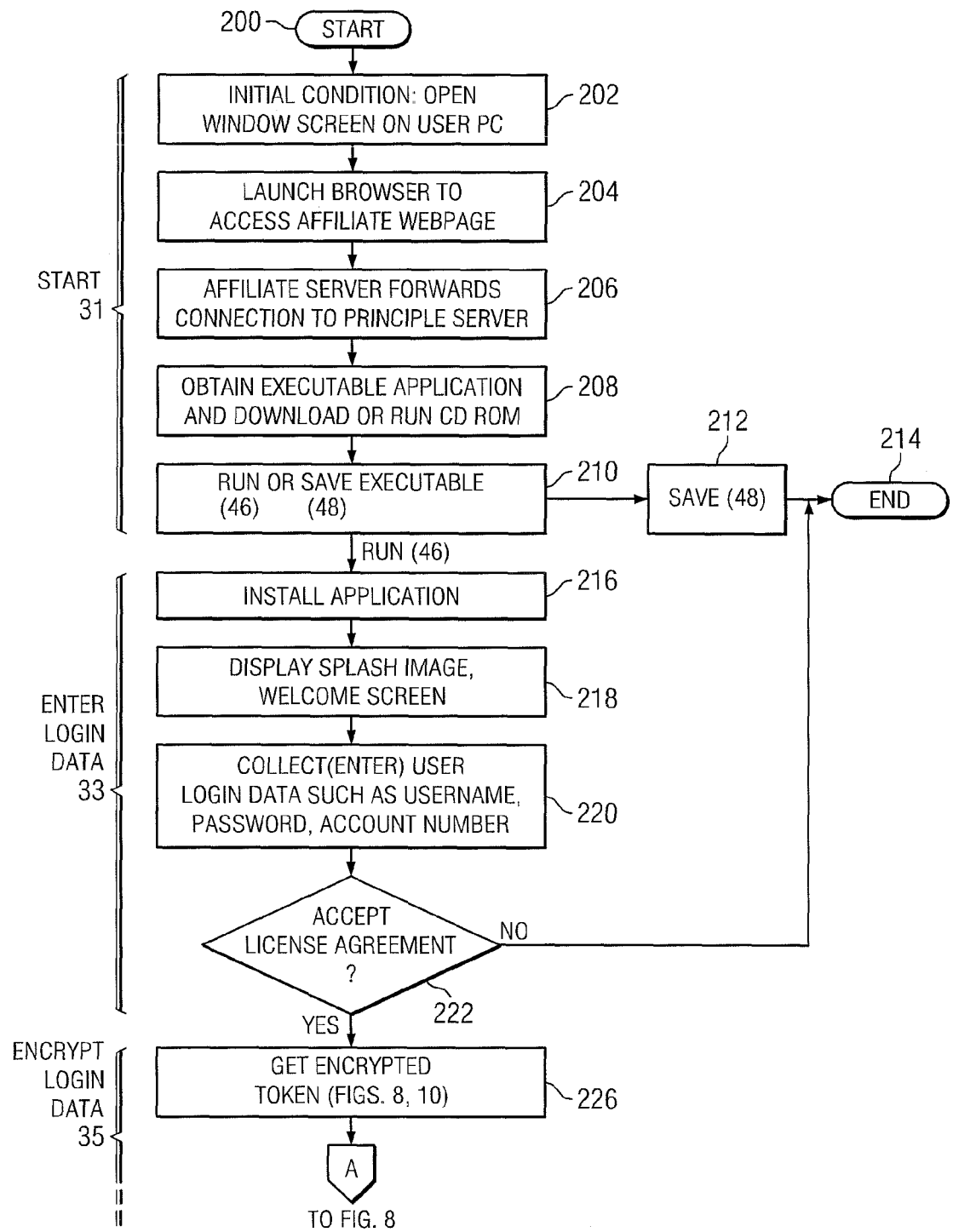
FIG. 7 illustrates a first portion of a flow chart of one alternate embodiment of the method of the present invention that includes provision for encrypting user log-in information.

Referring to FIG. 7, there is illustrated a first portion of a flow chart of one alternate embodiment of a method for a single action login that includes encryption of the login information. FIG. 7 is the first of a series of figures used herein to describe the method in detail. In brief, the method may be summarized as follows. Following entry by the installing user of the user's login credentials, i.e., an application ID number, a version number, the username and password data, etc. (similar to step 34 in FIG. 2 described herein), this data may be encrypted at the user PC using a symmetric encryption algorithm such as XOR that uses the XOR operator during the encryption and decryption. The encrypted login information is sent to an affiliate server to prepare an encrypted token—a data packet containing the login information—using a keyed symmetric encryption algorithm such as the well known Blowfish algorithm. The encryption using the Blowfish algorithm may be performed at the affiliate server. However, it is typically well within the capability of the current desktop computers to perform the second (higher) level encryption of the token. The principle reason to perform the encryption at the server is so that the key is stored there instead of at the user PC. Following production of an encrypted token containing the login information, the encrypted token is transmitted to the user PC and filed in the user data folder (e.g., a user document folder) of the user PC for later access during the single action login.

Figure 8:
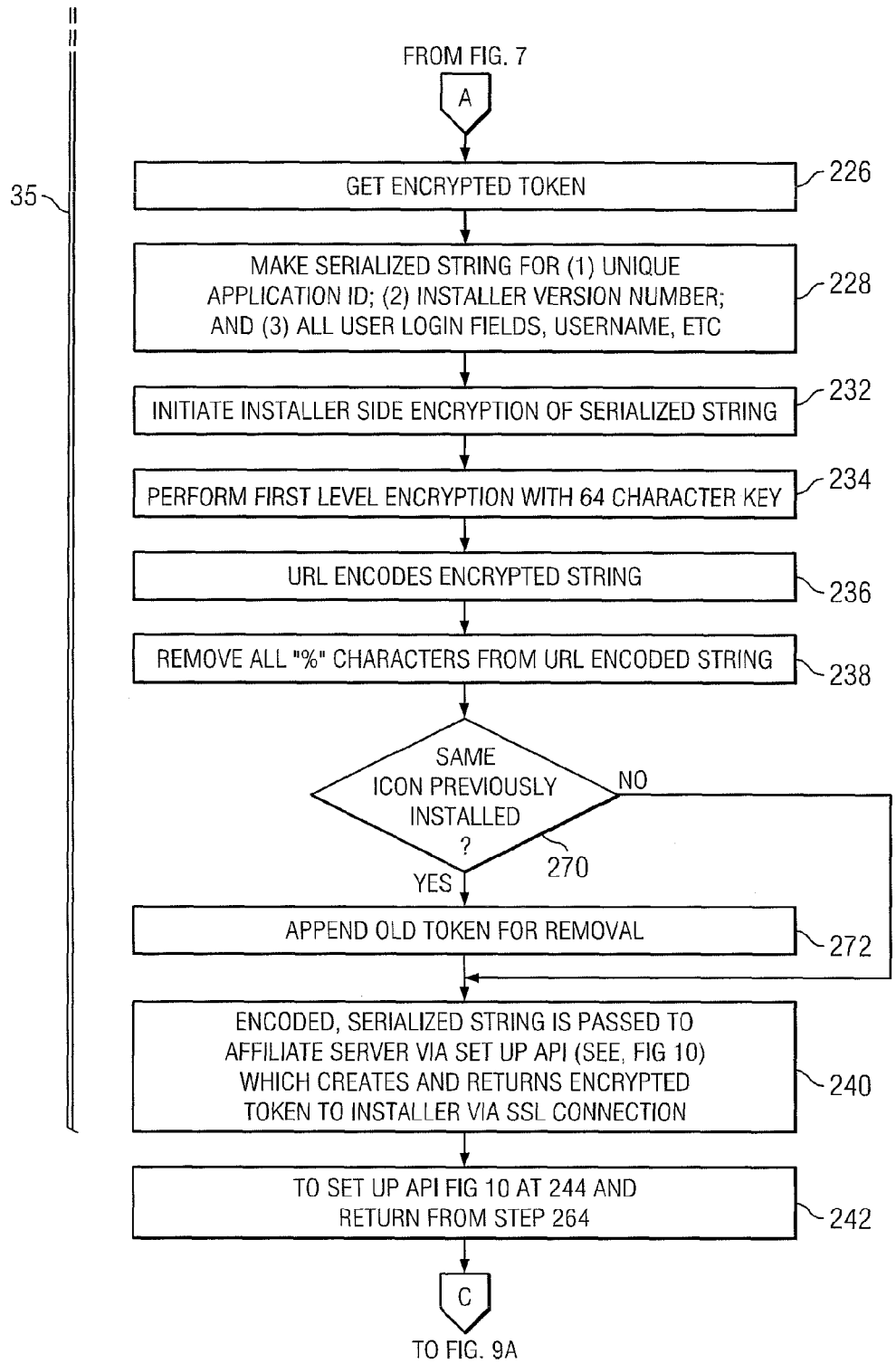
FIG. 8 illustrates a second portion of the flow chart of FIG. 7.
Figure 9A:
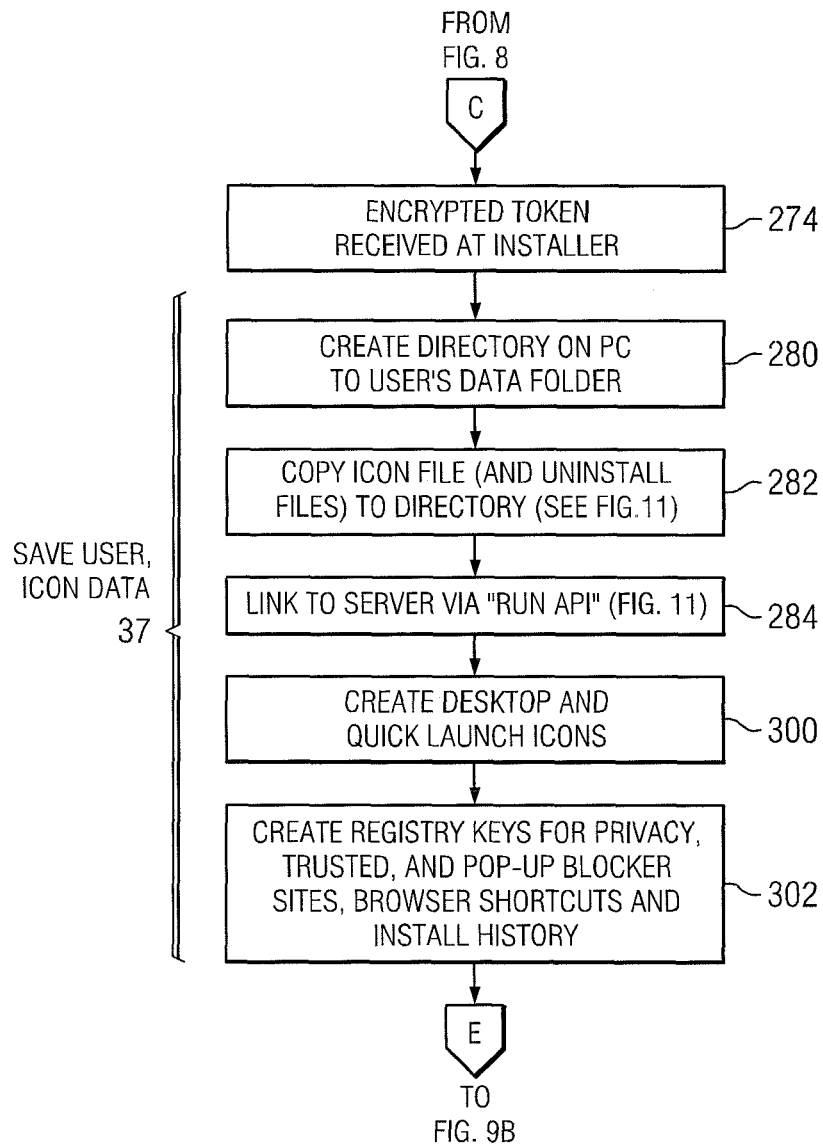
FIG. 9A illustrates a third portion of the flow chart of FIGS. 7 and 8.
Figure 9B:
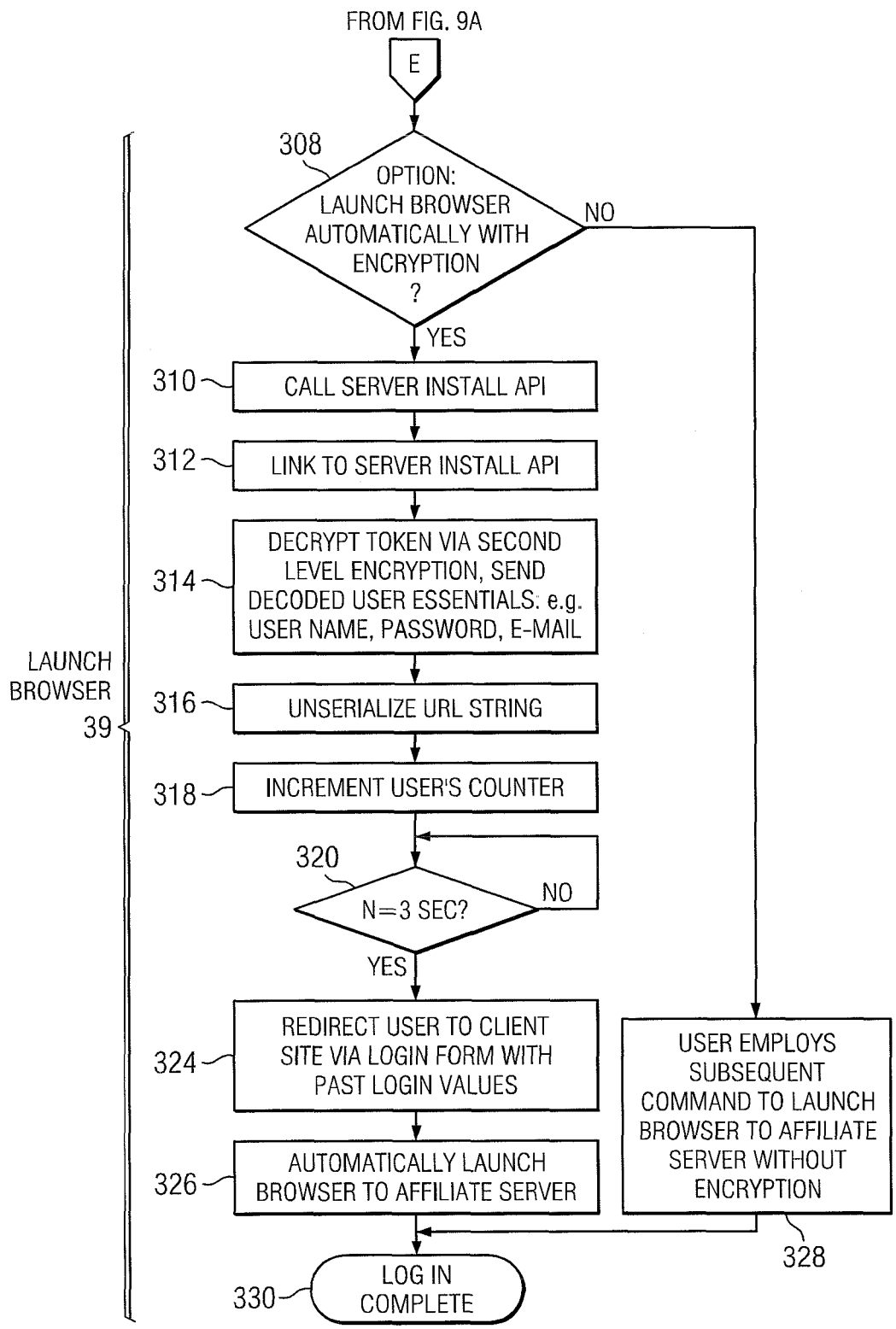
FIG. 9B illustrates a fourth portion of the flow chart of FIGS. 7, 8 and 9A.
Figure 10:
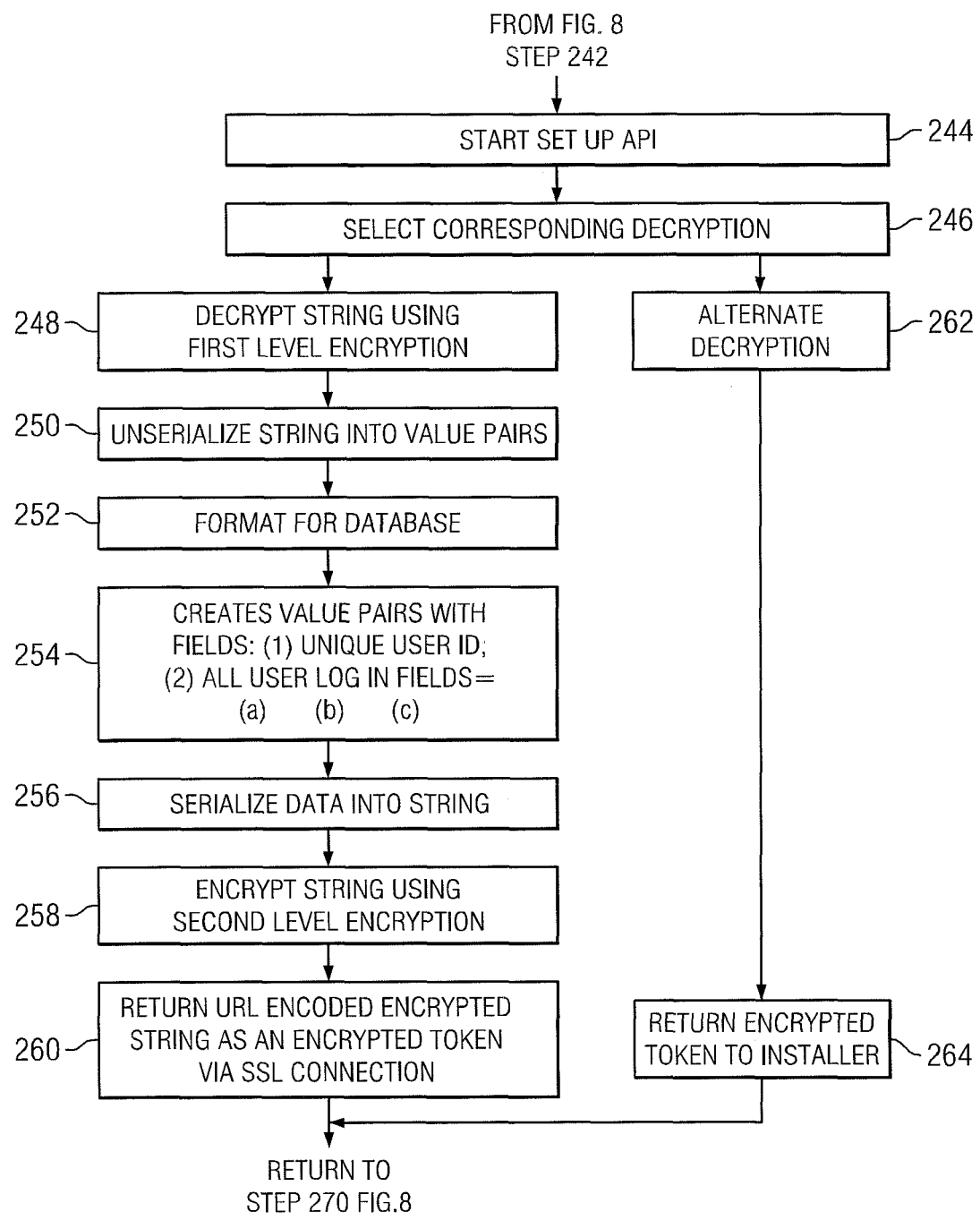
FIG. 10 illustrates a fifth portion of the flow chart of FIGS. 7, 8, 9A and 9B.
Figure 11:
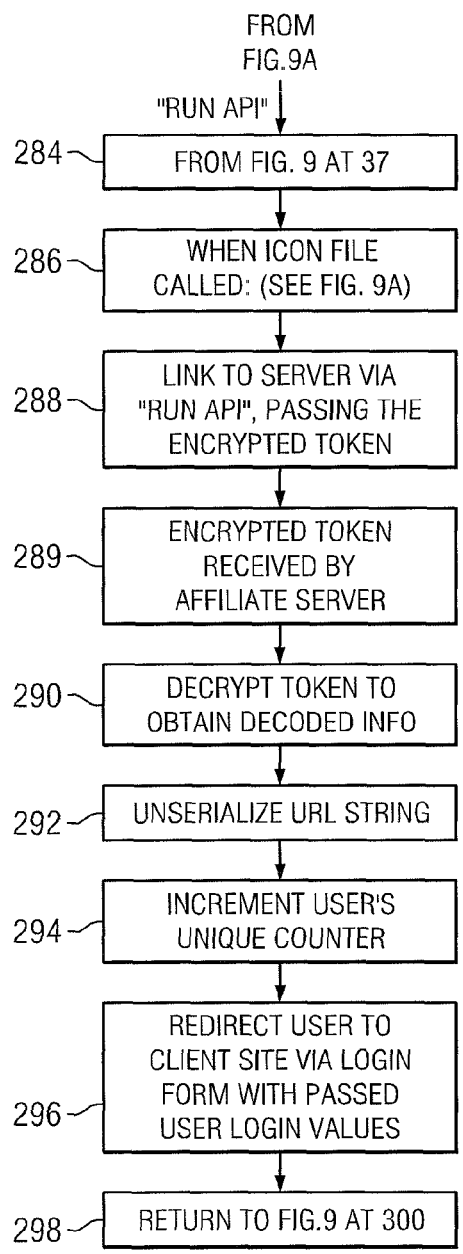
FIG. 11 illustrates a sixth portion of the flow chart of FIGS. 7 through 10.
Figure 12:
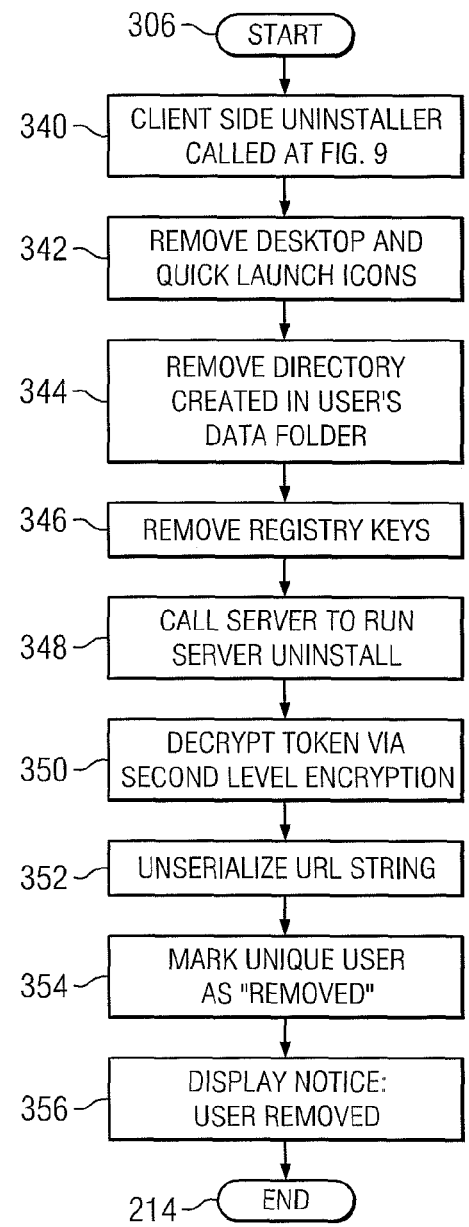
FIG. 12 illustrates a separate process for removing the single action log-in method with encryption that is described in FIGS. 7-11.

FIGS. 7 through 11 illustrate in flow chart form the steps of the method of one preferred alternate embodiment of the present invention. Persons skilled in the art will recognize that there is a variety of ways to implement encryption into the single action log-in system and method of the present invention. Illustrated in FIGS. 7 through 11 is only one such embodiment to illustrate the principles of the invention. It will be observed upon inspection that FIGS. 7 through 9 present an expanded version of the process illustrated in FIG. 2 that includes the encryption process steps. FIGS. 7 through 9 (FIG. 9 is shown on two sheets labeled FIG. 9A and FIG. 9B) also include in somewhat greater detail the single action login method so that the integration of encryption with the installation of the login method is more clearly illustrated. One feature of FIGS. 7 through 9 is to embracket and denote groups of steps using the odd reference numbers 31 through 39, which correspond substantially and respectively with the even numbered steps 30 through 38 that appear in FIG. 2. FIGS. 10 through 12 illustrate other segments of the .exe application program that may be called from several steps in the installation process shown in FIGS. 7 through 9. Therefore, several of the figures (Numbers 10 and 11) will be described in the sequence in which the process depicted appears, rather than the numerical order of the figures. FIG. 10 illustrates the process of producing the encrypted token at the affiliate server. FIG. 11 illustrates a portion of completing the installation process after the encrypted token is received by the user PC from the affiliate server. FIG. 12 illustrates a separate program segment that provides for uninstalling the method for single action login.

The encryption process proceeds in two phases. The login credentials are first encrypted in the user PC using a first level algorithm. After encoding the encrypted credentials in a URL string, the string is sent to the affiliate server to perform a second encryption of the log-in credentials using a second level algorithm to produce an encrypted token. FIG. 7 illustrates preliminary steps of the installation leading to the first encryption phase (in FIG. 8) that results in requesting an encrypted token from the affiliate server in the second phase (in FIG. 10, called from FIG. 8). FIG. 8 illustrates the initial encryption phase. FIG. 9 illustrates completing the installation of the single action method including installation of the icon file used when the single action login is selected. FIG. 9 also includes the steps leading to the launch of the browser from the user PC to perform the connection to the destination website upon selection of the single action. Finally, FIG. 9 includes the call to the uninstall routine of FIG. 12 to be described.

Figure 13:
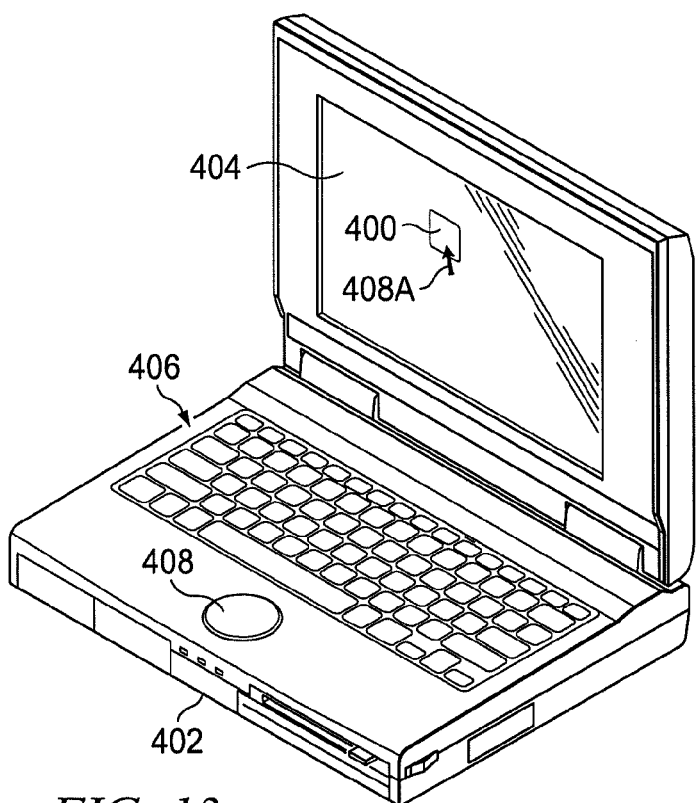
FIG. 13 illustrates an alternate embodiment of the present invention.
Figure 14:
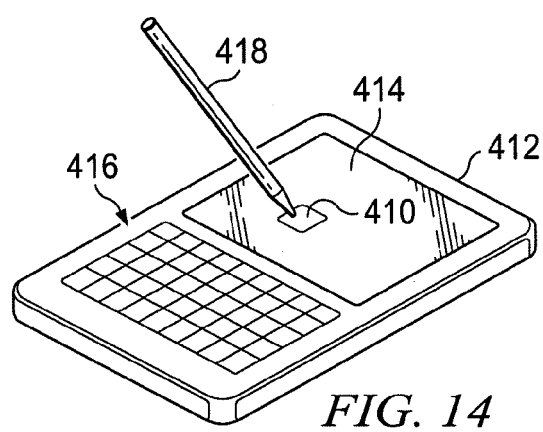
FIG. 14 illustrates another alternate embodiment of the present invention.
Figure 15:
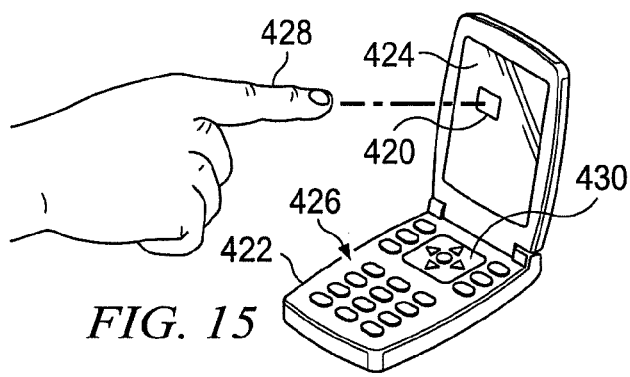
FIG. 15 illustrates another alternate embodiment of the present invention.

The alternate embodiments shown in FIGS. 13, 14, and 15 illustrate examples of structural features enabling a single action. In FIG. 13 an icon 400 selectable by a cursor 408A is shown on the display 404 of a laptop computer 402 also equipped with a keyboard 406 and a trackball 408. In FIG. 14 and icon 410 selectable by a pointer 418 is shown on a display 414 of a PDA 412 also equipped with a keyboard 416. In FIG. 15 an icon 420 selectable by a finger 428 is shown on the display 424 of a cellular telephone 422 also equipped with a keyboard 426 and a navigating button array 430.

In the following description the term "user PC" is understood to mean any of a variety of computing devices having the capability of communicating with other computing devices or server facilities of websites or other locations accessible via the Internet or other wide area network, whether via wired or wireless link, or whether via fixed or mobile installations or devices. Examples include but are not limited to personal or business computers or terminals, desktop, laptop or tablet computers (FIG. 13), cellular telephones, personal digital assistants (PDAs) (FIG. 14) and such as devices known as Blackberry®, iPhone, iPad™, and the like. Persons skilled in the art will recognize that these current examples may evolve into other kinds of devices or machines that retain or provide the capability of launching a connection to an affiliate site upon executing a single action upon or in association with an icon that is visible or projected by the user PC or other equivalent device or machine, for example. Such evolution may produce devices or machines that embody as an icon a sound, to which an appropriate single action response may be a predetermined follow up sound received by the device or machine emitting the initial iconic sound.

In the following description the term "user data folder" is understood to mean the private or personal data folder in the user PC device for storing data, documents, or other files. Such folders generally provide access that is unrestricted to the user of the individual PC. A personal "user data folder" is a general term for a user document folder such as, for example, the "My Documents" folder on personal computers employing Windows® operating systems current as of this writing. Thus, any equivalent accessible storage system or method in future devices or machines that can store icons, user login information, encrypted or unencrypted, is contemplated by the present invention.

In the following description the term "pointer" is understood to mean a graphical symbol or physical object or signal that is provided at the user PC location to indicate and/or select an action associated with an icon or other character or image segment appearing on a display or screen or image panel. The pointer may include but not be limited to a cursor, arrow or other symbol appearing as part of the graphic in a displayed image, a finger or other pointing device (See FIGS. 14 and 15) used for touching the surface of the display, a light beam or other signal aimed at a specific portion of a displayed image, and the like. In many such embodiments a switch may be activated as a way to select the thing indicated by the act of pointing to it. In other embodiments the pointing implement may include a signal that initiates a selection of the action associated with the thing indicated by the act of pointing.

Some other terms that appear in the following description include "XOR," which is an abbreviation for the logical operation "Exclusive OR." In the present context this term is used as the name of a form of encryption of textual information. The term "API" is an acronym for "Application Programming Interface," which is a software program or module that provides interrupts, calls, or data formats that enable application programs (such as a browser) to initiate access to services on a network or communication with other programs, etc. The term "SSL" is an acronym for "Secure Sockets Layer," which provides a secure channel in the connection layer of applications that facilitate communication between a website server and a user's browser, for example. The SSL protocol typically employs asymmetric encryption (e.g., public key, private key) for ensuring secure communication between the sender and the recipient. The familiar term "URL" is the acronym for "Uniform Resource Locator," which is a string (serial listing of characters) expression composed according to a standard format that identifies the location of a site or entity on the Internet and an item of information at that location.

Referring to FIG. 7 there is illustrated a first portion of a flow chart of one alternate embodiment of the method of the present invention that includes provision for encrypting user log-in information. The flow starts at step 200 followed by an initial condition, with the user at a desktop or other personal computer (PC), i.e., the "user PC," and having an open window displayed on the screen of the user PC in step 202. In step 204, the browser is launched to access the affiliate web page at the URL for the affiliate web page at the destination website, followed in step 206 wherein the affiliate server in one embodiment forwards the connection to the principal server to obtain and download the executable application from the principal server via the affiliate server. Alternatively the user may obtain and run a CD or other media containing the executable application for installing and operating the method of a single action log in via the same secure process. The executable application (e.g., "SmartIcon.exe") may be run or saved for later installation in step 210. If it is to be saved, the process shifts to step 212 for saving and the process ends at step 214. If, however, the executable application is to be installed, the flow advances to step 216 for that purpose. After a welcome screen appears in step 218 (an optional step, as will be described herein below), user login information is requested such as user name, password, account number and the like in step 220. In the next step 222, the user is provided the opportunity to review and accept a license agreement covering the use of the executable application. If the user agrees by indicating YES, the flow proceeds to step 226 to initiate the process to obtain an encrypted token as illustrated in FIG. 8.

Referring to FIG. 8 there is illustrated a second portion of the flow chart of FIG. 7. Following step 226, the executable application in step 228 assembles a serialized string containing the following information: (1) a unique application ID; (2) the version no. of the installer (i.e., a portion of the executable application); and (3) all other user log-in fields including the user name, password, etc. Before encryption, this data is arranged in an array of value pairs, wherein variables are associated with their values in table form and then read out or assembled into a serial string of bits representing each variable and its value in turn. For example, the value pairs might appear as:

| | |
|---|---|
| [s] => 25 | (the application ID) |
| [v] => 2.0.2009.12.11 | (the version number) |
| [u1] => SomeUserName | (the user name) |
| [u2] => SecretPassword | (the password); | and the serialized string of paired values might appear as:
a:4:{s:1:"s";i:25;s:1:"v";s:14:"2.0.2009.12.11";s:2:"u1";s: 12:"SomeUserName";
s:2:"u2";s:14:"SecretPassword".

Next, the flow advances to step 232 where encryption of the serialized string is initiated at the installer side (user PC) and performed using the first level encryption in step 234. In this illustrative example, an XOR algorithm may be used. The XOR cipher in this example may be a symmetric algorithm using the same 64 bit key for both encryption and decryption. Following the encryption step in step 234, the serialized, encrypted string must be purged of non-alphanumeric characters because these characters will not be accepted in the URL string to be transmitted. Thus, the URL encoding step 236 replaces the non-alphanumeric characters in the serialized string (except hyphen - and space _) with a % sign followed by two hex digits and spaces encoded as + signs. In this scheme, the % sign is redundant, and may be removed as in step 238, to save space. From step 238, the flow advances to step 270 shown in FIG. 8 in which the routine tests whether the same icon associated with the present installation was previously installed. If the response is affirmative, the old token is appended for removal in step 272. If the response is negative, the program proceeds to step 240.

In step 240 of FIG. 8, the encoded, serialized string of data is passed to an affiliate server via a set up API (Application Programming Interface) as will be described for FIG. 10. These steps create the second level encrypted token to be returned to the installer via an SSL ("Secure Sockets Layer") connection to provide a secure channel. From step 240 the flow proceeds to step 242 to set up the API at step 244 illustrated in FIG. 10.

In FIG. 10, from step 244 the process begins at step 246, and the corresponding first level decryption algorithm is applied in step 248 to decrypt the string (in this example using XOR cipher encryption) received from the installer for further processing. The decrypted string is unserialized into value pairs in step 250 and formatted for storage in a user database in step 252. Value pairs are again created in step 254, and followed by serializing the data in step 256 prior to encrypting the log in credentials using the second level encryption in step 258. In this description, "second level" encryption means a more robust algorithm that may be used to perform the encryption, without limiting the algorithm to a particular choice. Upon encryption, the token is returned to the installer in step 260 via the SSL connection. If it is desired to use an alternate algorithm for encryption/decryption, step 262 is provided to allow the use of a different decryption algorithm. In step 264, the flow advances to FIG. 9A at step 274.

Referring to FIG. 9A there is illustrated a third portion of the flow chart of FIGS. 7 and 8, for saving the user and icon data at the user PC in the user data folder. The flow enters FIG. 9A along path "C" into step 274 at the event whereby the encrypted token is received at the installer side, i.e., the user PC. In the next step 280 a user data folder is created, along with a directory path thereto, enabling it to receive and save the contents of the icon file when copied thereto in step 282. In step 284 the routine establishes a "Run API" link to the affiliate server to obtain the quick launch icon(s) and login credentials as shown in FIG. 11.

Referring now to FIG. 11 there is illustrated a sixth portion of the flow chart of FIGS. 7 through 9A and 9B, for obtaining the icon file from the affiliate server. This portion, beginning with step 284, is called from step 282 in FIG. 9A. The flow begins at step 284 and proceeds to step 286 when the icon file is called in the process shown in FIG. 9A. In the following step 288 the link to the affiliate server is established whereupon the routine passes the stored, encrypted token containing the icon and log in credential information to the affiliate server. After the token is received by the affiliate server in step 289, the flow advances to step 290 to decrypt the token via the corresponding second level algorithm to obtain the decoded information.

Continuing with FIG. 11, after the encrypted token is received at step 289, the token is decoded in step 290, the string of data is unserialized in step 292, the user's unique counter incremented in step 294, and the user is redirected to the client side according to information in the login form to retrieve the user login values passed to the user previously in step 288. In the next step 296 the flow proceeds to step 298 so that the flow may return to FIG. 9A at step 300. Step 300 of FIG. 9A provides for creating the quick launch icons for the desktop or other user display. The process in step 300 may include, as part of a START menu folder, icons corresponding to options for launch, uninstall, and reinstall. The launch option process may be exercised according to FIG. 9B to be described. The uninstall option process may be exercised according to FIG. 12 to be described. A third option, which may be called "reinstall icons," may be used to re-set the user credentials in the event that they need to be changed. Re-setting user credentials is often required to maintain a high level of security. Returning to step 302, registry keys may be created for privacy, trusted and pop-up blocker sites, browser shortcuts, and installation history. Before advancing to the launch of the browser on the user PC, the routine proceeds to FIG. 9B.

Referring to FIG. 9B there is illustrated a fourth portion of the flow chart of FIGS. 7, 8 and 9A. From step 306 the process advances to step 308 in which the user is given two options: (a) to automatically launch the browser (version with encryption), or (b) to not automatically launch the browser (version with encryption); that is, to require further action by the user to launch the browser. If the user selects YES (option (a) for automatic launch) the flow proceeds to call the server API in step 310 and establish the link to the "server install API" in step 312. The browser is launched to the affiliate server, where in step 314 the server decrypts the encrypted token via the corresponding second level encryption, producing the decoded user credentials, e.g., username, password, e-mail address, etc. The information is unserialized in step 316, the user's counter is incremented in step 318, and a timer is started in step 320. The purpose of the timer, which may be set at three seconds, for example, is to provide time to display a thank you or other notice on the user PC screen. This time, which may be set to any appropriate value, may be used to communicate other information to the user PC. Next, in step 324, control is redirected to the client site via the login form with login values passed earlier to the affiliate server (see FIG. 8, step 240). At this point, the user PC is set to receive the single action executed by the user and launching the browser to the affiliate server to complete the single action log in at step 326. The log in is completed at step 330. Returning to the option query in step 308, if the user selects NO (option (b)

requiring additional user steps), the process advances to an alternate portion of the present routine that requires the user, as one example, to execute a command to launch the browser to the affiliate without encryption of the log in credentials in step 328. When the command is given, the log in is completed and the routine ends in step 330.

Referring to FIG. 10, a fifth portion of the process of FIGS. 7, 8, 9A and 9B, the steps 244 through 264 for producing the encrypted token and returning it to the installer side are depicted. As described herein above, following the description of FIG. 8, this encryption using a second level algorithm may take place at the affiliate server to take advantage of the greater processing power that is most likely present at that location. For convenience, the description of FIG. 10 is repeated here. Beginning at step 246, the corresponding first level decryption algorithm is applied in step 248 to decrypt the string (in this example using XOR cipher encryption) received from the installer for further processing. The decrypted string is unserialized into value pairs in step 250 and formatted for storage in a database in step 252. Value pairs are again created in step 254, and followed by serializing the data in step 256 prior to encrypting the log in credentials using the second level encryption in step 258. Upon encryption, the token is returned to the installer in step 260 via the SSL connection. If it is desired to use an alternate algorithm for encryption/decryption, step 262 is provided to allow the use of a different decryption algorithm. In step 264, the flow advances to step 270 shown in FIG. 8.

Referring to FIG. 12 there is illustrated a separate routine, which provides for un-installing the .exe application installed as illustrated in FIGS. 7 through 11. It may be called from step 300 shown in FIG. 9A when the "Uninstall" menu option is selected, which transfers the flow to step 340 depicted in FIG. 12. Step 340 starts the uninstall routine at the user PC, by calling the "Client Side Uninstaller." The flow on FIG. 12 proceeds to step 342 to remove the desktop and quick launch icons from the user data folder. Then, in step 344, the directory to the user data folder for storing these items is removed, followed by removal of the registry keys in step 346. Thereupon the server at the affiliate website is called to remove the "Server Uninstall" portion of the .exe application in step 348. In step 350 the encrypted token is decrypted using the appropriate second level algorithm (which is the Blowfish algorithm in this illustrative example). Then the URL string is unserialized in step 352, the unique user is marked as "removed" in step 354, and a notice is displayed on the user PC screen that the user has been "removed" from the system that provides the single action login as described herein. At step 356 the Uninstall routine ends.

While the invention with the encryption feature included has been shown in only one of its forms, it is not thus limited but is susceptible to various changes and modifications without departing from the spirit thereof. For example, the method of encrypting the user login credentials may vary with the application or the entities involved. Although it is preferred that the second level encryption of the token containing user login credentials be more robust than the first level encryption used in the initial access and installation of the .exe application for the single action login, it may not be necessary in some applications. Thus, the token may, in some cases, be encrypted similarly to the initial access steps. Although symmetric encryption algorithms are described in the example above, it is possible that asymmetric encryption would be appropriately used in some applications. It has been assumed in the description of the illustrative example that the user PC lacks processing power to perform encryption or decryption of the more robust or advanced encryption algorithms. Thus, this assumption may be called into question and discarded in certain applications.

What is claimed is:

1. A method for enabling connection, through a single user action, and secure automatic login to a destination website on the Internet via an affiliate web server associated with the destination website, comprising the steps of:
configuring a user PC to include a browser and a user data folder that is unrestricted to the user of the user PC for storing therein a predetermined icon corresponding to the destination website, user login credential information, and a URL for the destination website;
producing an encrypted token encrypting the user login credential information and storing the encrypted token in the user data folder;
storing the predetermined icon, user login credential information, and the URL for the destination website in the user data folder;
displaying the predetermined icon on the user PC;
associating launching the browser with executing a single user action on the predetermined icon; and thereafter
executing the single user action on the predetermined icon displayed on the user PC; and
establishing a secure connection to the destination website using the encrypted token; wherein
the secure automatic login is accomplished without the use of cookies or a file manager program, or without storing the user login credential information external to the user PC.

2. The method of claim 1, wherein the secure automatic login is accomplished without storing the user login credential information in a data folder having restricted access.

3. The method of claim 1, wherein the step of configuring a user PC comprises the step of:
launching the browser to access a principal web server through a link to the affiliate web server corresponding to the destination website;
downloading an executable application from a file on the principal web server to the user PC;
running the executable application on the user PC to configure the user PC for the single user action connection;
assembling a serialized URL string for connecting to the affiliate web server; and
storing the URL string in the user data folder.

4. The method of claim 1, wherein the step of producing an encrypted token comprises the steps of:
performing first level encrypting at the user PC of a serialized string of data representing the user login credential information;
transferring the encrypted serialized string to the affiliate web server;
decrypting the serialized string at the affiliate web server;
encrypting the serialized string of the user login credential information using a second level encryption algorithm to produce the encrypted token; and
returning the encrypted token to the user PC.

5. The method of claim 1, wherein the step of storing the predetermined icon comprises the step of:
writing the predetermined icon associated with the destination website from the affiliate web server to a file in the user data folder.

6. The method of claim 1, wherein the step of associating launching the browser with executing the single user action comprises the steps of:
reading the destination URL information from the user data folder;

launching the browser to the destination web site associated with the icon; and attaching the encrypted token to a message packet containing the URL information.

7. The method of claim 1, wherein the step of executing the single user action comprises the step of:

selecting the predetermined icon using a pointer positioned at the predetermined icon on a displayed graphic on the user PC.

* * * * *